United States Patent
Clemen, Jr. et al.

(10) Patent No.: US 10,641,742 B2
(45) Date of Patent: May 5, 2020

(54) BOND STRENGTH TESTING SYSTEMS AND METHODS AND COMPRESSION WAVE PRODUCING DEVICES FOR USE THEREIN

(71) Applicant: The Boeing Company, Chicago, IL (US)

(72) Inventors: Mark J. Clemen, Jr., Port Orchard, WA (US); Alan F. Stewart, Burien, WA (US); Dejan Nikic, Seattle, WA (US)

(73) Assignee: The Boeing Company, Chicago, IL (US)

( * ) Notice: Subject to any disclaimer, the term of this patent is extended or adjusted under 35 U.S.C. 154(b) by 198 days.

(21) Appl. No.: 15/830,469

(22) Filed: Dec. 4, 2017

(65) Prior Publication Data

US 2019/0170700 A1   Jun. 6, 2019

(51) Int. Cl.
G01N 29/24 (2006.01)

(52) U.S. Cl.
CPC . G01N 29/2431 (2013.01); *G01N 2291/0231* (2013.01); *G01N 2291/0234* (2013.01); *G01N 2291/02827* (2013.01)

(58) Field of Classification Search
CPC ..... G01N 29/2431; G01N 2291/02827; G01N 2291/0231; G01N 2291/0234
USPC .......................................................... 73/588
See application file for complete search history.

(56) References Cited

U.S. PATENT DOCUMENTS

| | | | | |
|---|---|---|---|---|
| 3,222,144 A | * | 12/1965 | Davenport | B21D 26/08 428/593 |
| 5,127,019 A | * | 6/1992 | Epstein | C21D 10/005 372/108 |
| 6,848,321 B2 | | 2/2005 | Bossi et al. | |
| 7,150,459 B2 | * | 12/2006 | Anderson | B62B 1/26 280/47.28 |
| 7,507,312 B2 | | 3/2009 | Bossi et al. | |
| 8,327,709 B2 | * | 12/2012 | Daraio | G01N 29/2437 73/632 |
| 8,359,924 B1 | | 1/2013 | Bossi et al. | |
| 9,625,425 B2 | | 4/2017 | Stewart et al. | |
| 2003/0052103 A1 | * | 3/2003 | Friedman | B23K 26/0604 219/121.78 |
| 2004/0187489 A1 | * | 9/2004 | Simburger | F17C 5/06 60/407 |
| 2007/0006723 A1 | * | 1/2007 | Waddell, Jr. | F42D 5/045 89/36.02 |
| 2010/0080934 A1 | * | 4/2010 | Schild | C23C 14/165 427/576 |
| 2015/0128709 A1 | * | 5/2015 | Stewart | G01N 29/11 73/588 |

* cited by examiner

*Primary Examiner* — Jacques M Saint Surin
(74) *Attorney, Agent, or Firm* — Walters & Wasylyna LLC

(57) ABSTRACT

A nondestructive bond strength testing method, including: coupling an expendable device to a structure under test, the expendable device including a patterned planar array of exploding bridge wires; simultaneously vaporizing the patterned planar array of exploding bridge wires by applying a pulse of electrical energy to the patterned planar array of exploding bridge wires; and sensing an initial disbonding signature of the structure under test.

53 Claims, 31 Drawing Sheets

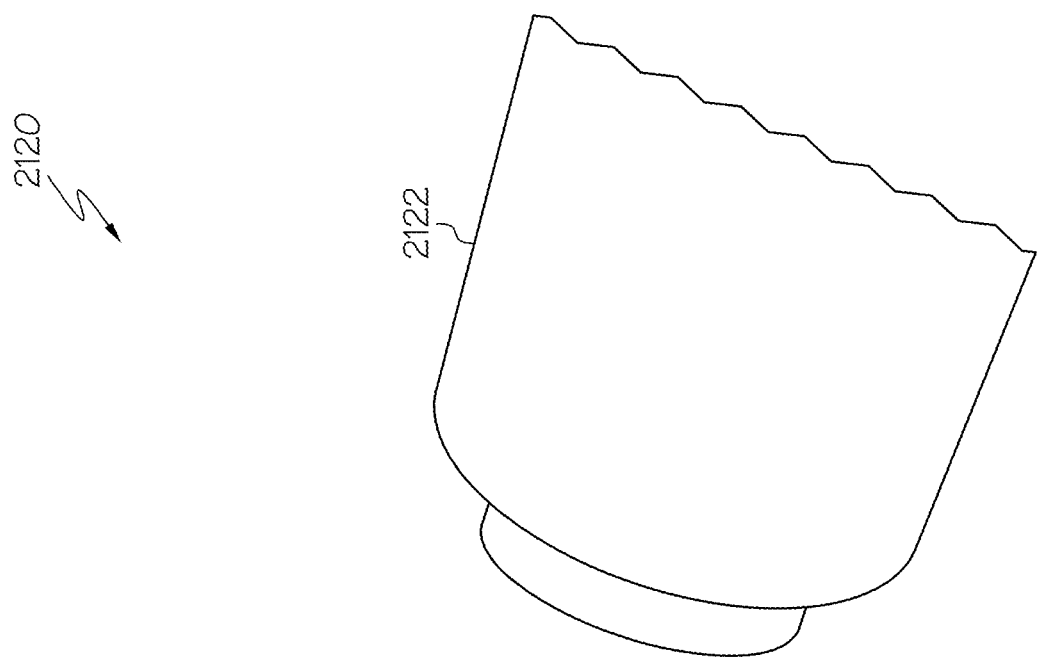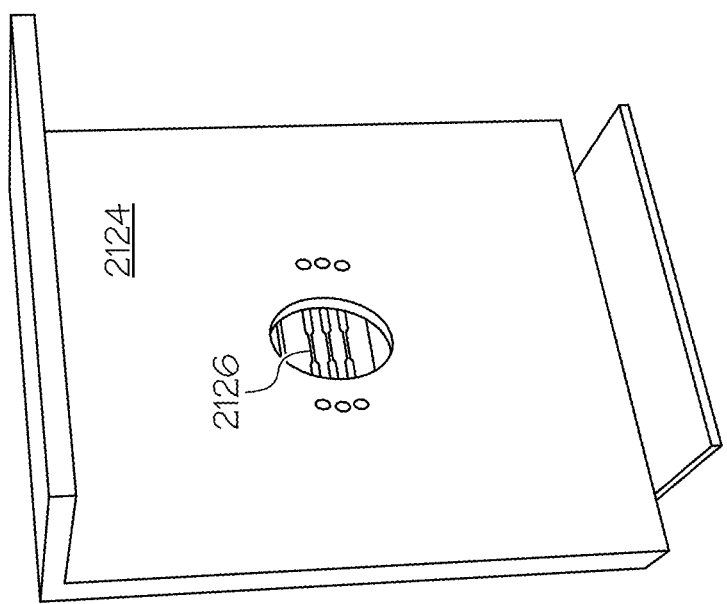
FIG. 21

BOND STRENGTH TESTING SYSTEMS AND METHODS AND COMPRESSION WAVE PRODUCING DEVICES FOR USE THEREIN

FIELD

The present application relates to the field of bond strength testing systems and methods and to compression wave producing devices for use in bond strength testing systems and methods.

BACKGROUND

Bonding of materials, in particular composite materials, is widely used in a variety of structural applications. Generally, it is desirable that a strength of the bond is able to be determined.

Conventional bond strength testing includes static proof testing. Static proof testing can be performed to the limit load. Limit load is the maximum load that the structure is expected to see in service. However, the cost of static proof testing is high.

In absence of bond strength testing, validation of bond strength for new components is commonly performed using witness coupons. The witness coupons are samples that are assembled at the same time as bonded structure using the same materials and following as closely as possible the bonding process of the real structure. The witness coupons are then tested to failure to validate the quality of the bonding process. While useful as an indicator, these tested coupons are not a part of the real structure of the new components. Additionally, witness coupons are not available for in-service inspection or repair applications of bond strength testing.

Conventional nondestructive evaluation methods, such as ultrasonics, x-rays, and acoustics, detect the presence of a defect such as a void or unbond within a bonded structure but do not the measure the bond strength thereof.

A laser bond strength testing method may be implemented by fast ablation of the surface of a sacrificial surface layer, such as a strip of polyvinyl chloride tape, by action of the laser on the surface creating heat and a plasma which results in a planar compression wave into a surface of the structure under test and a tension wave upon reflection from an opposing surface of the structure under test. The tension wave interrogates the strength of the bonded structure. The weakest element in the structure fails first, be it in the individual elements bonded together or in the adhesive layer or at the interface between the adhesive and the individual elements.

Laser ablation is well suited for the bond inspection method, creating a sub-microsecond rise time compression/tension wave. Typical laser fluence levels range from 1-50 $J/cm^2$ based on available laser sources and the strength of materials under test. More fluence is required to test heavier gauge materials and this must be deposited into the structure carefully so as to not damage the material. Changing the distribution of laser energy across the surface, by using an annular beam, for example, allows more energy to be deposited without damaging the composite and permits the inspection of heavier gauge material.

Carbon fiber reinforced polymer composites are commonly used in large aircraft structures and are commonly bonded with adhesives. The resulting structures are commonly used to support loads in aircraft and other vehicles, and laser bond strength testing methods have been used to test the strength of the bonds.

Although laser bond strength testing methods are effective, the laser required for laser bond strength testing methods is very expensive, limited in available energy, large in size, requires environmental controls and significant electrical power (>10 kW), and it is difficult to transport the laser energy to the areas where bond testing should be performed.

Therefore, nondestructive bond strength testing for complex structures at low cost is needed. Furthermore, as more automated technology is employed for fabrication of carbon fiber reinforced polymer composite, automated nondestructive bond strength testing is needed.

Accordingly, those skilled in the art continue with research and development in the field of bond strength testing systems and methods.

SUMMARY

In one embodiment, a nondestructive bond strength testing method includes: coupling an expendable device to a structure under test, the expendable device including a patterned planar array of exploding bridge wires; simultaneously vaporizing the patterned planar array of exploding bridge wires by applying a pulse of electrical energy to the patterned planar array of exploding bridge wires; and sensing an initial disbonding signature of the structure under test.

In another embodiment, a nondestructive bond strength testing system includes: an expendable device for coupling to a structure under test, the expendable device including a patterned planar array of exploding bridge wires for producing a planar compression wave; a pulsed-power unit for applying a pulse of electrical energy to the patterned planar array of exploding bridge wires; and a disbond detecting sensor for sensing an initial disbonding signature of the structure under test.

In yet another embodiment, an expendable device for producing a compression wave includes: a substrate; and a patterned planar array of exploding bridge wires formed on the substrate.

Other embodiments of the disclosed bond strength testing systems and methods and compression save producing devices will become apparent from the following detailed description, the accompanying drawings and the appended claims.

BRIEF DESCRIPTION OF THE DRAWINGS

FIG. 21 is a test set-up for a high voltage test lab;

DETAILED DESCRIPTION

Figure 1:
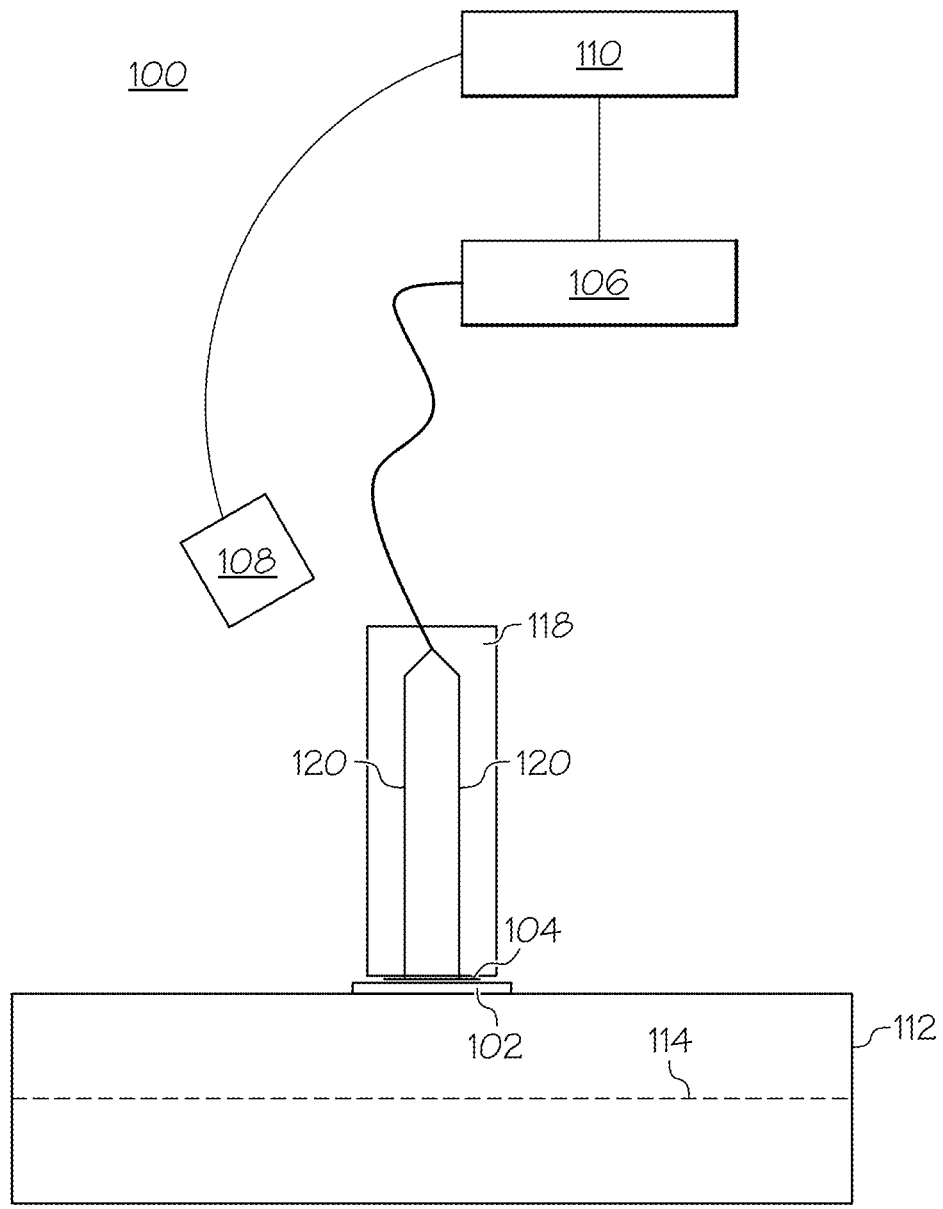
FIG. 1 is a side view of a nondestructive bond strength testing system according to the present description.

FIG. 1 illustrates a nondestructive bond strength testing system 100 that includes an expendable device 102, a pulsed-power unit 106, a disbond detecting sensor 108, and a controller 110.

The expendable device 102 includes a patterned planar array of exploding bridge wires 104, positions and arrangements of which are later explained in further detail. The structure of the expendable device 102 includes any structure capable of positioning the patterned planar array of exploding bridge wires 104 in a coupling relationship with a structure under test 112 having a bond region 114 to be inspected, such that a planar compression wave formed by a vaporization of the exploding bridge wires is transmitted into the structure under test 112.

The patterned planar array of exploding bridge wires 104 react to single applied pulse of electrical energy by simultaneously vaporizing and creating the corresponding planar compression wave. By coupling the expendable device 102 to the surface of the structure under test 112, the planar compression wave generated by the plurality of patterned planar array of exploding bridge wires 104 propagates from the surface of the structure under test 112 and through the structure under test 112 to another surface so that the compression wave reflects from the second surface as a tension wave, which applies a tensile stress to the bond region to be inspected. If the strength of the bond region is weak, then the tensile stress applied by the tension wave causes the onset of a disbond in the material whose signature can be sensed.

By controlling the size and amount of exploding bridge wires in the patterned planar array of exploding bridge wires 104 and the amount of electrical energy applied to the array, the bond strength testing system 100 permits for precise control of the energy of the resulting planar compression wave transmitted into the structure under test 112, and the bond strength testing system 100 provide for a broad range of energies that can be selected.

The pulsed-power unit 106 applies a pulse of electrical energy to the patterned planar array of exploding bridge wires 104 in the expendable device 102. The pulsed-power unit 106 may control characteristics of a resulting compression wave by adjusting the characteristics of the pulse of electrical energy applied from the pulsed-power unit. For example, by changing the inductance and thus the timing of the electrical discharge, a waveform of a resulting planar compression wave may be stretched or compressed in time. Alternatively, a variation of the expendable device 102 may be used under constant pulse characteristics to adjust the compression wave energy transmitted into the structure under test 112.

The disbonding sensor 108 detects a characteristic signature of a disbond formed in the inspected bond region 114 of the structure under test 112. The disbonding sensor 108 may detect the disbonding signature independently from the disbonding, such as by way of ultrasound, x-rays, or acoustics, or the disbonding sensor may detect the disbonding signature simultaneously with the disbonding, such as by way of a surface motion detector that detects and measures the surface motions, which may then be correlated to the pulse of electrical energy applied to determine whether the inspected bond region 114 failed as a result of the induced stress. The surface motion detector may detect resultant tension waves by a VISAR (Velocity Interferometer System for Any Reflector) device, which measures velocity on the surface of structure under test 112. From the velocity data, translaminar tension loads may be determined, along with an internal failure of the structure under test 112.

The controller 110 is programmed to actuate the pulsed-power unit 106 to apply a pulse of electrical energy to the patterned planar array of exploding bridge wires to vaporize the patterned planar array of exploding bridge wires 104. The controller may include a processor and storage device. The processor serves to execute instructions for software that may be loaded into memory. The processor may include a plurality of processors, a processor unit, a multi-processor core, or some other type of processor. A storage device is any piece of hardware that is capable of storing information, such as, for example, without limitation, data, program code in functional form, and/or other suitable information either on a temporary basis and/or a permanent basis. Memory is an example of a storage device. Memory may be, for example, a random-access memory or any other suitable volatile or non-volatile storage. The controller 110 may also be connected with the sensing system and may be programmed to perform analysis of data collected thereby and to present results to a user.

Although not shown, the nondestructive bond strength testing system 100 may further include a coupling material (e.g., coupling gel) positioned between the expendable device 102 and the structure under test 112. The coupling material adds contact area between the expendable device 102 and a surface of the structure under test 112 by filling in gaps therebetween to ensure that the planar compression wave generated with the patterned planar array of exploding bridge wires 104 is efficiently transmitted into the structure under test 112.

In the illustration of FIG. 1, the nondestructive bond strength testing system 100 further includes an inspection head 118, which includes any structure for retaining the expendable device 102 against the structure under test 112. In retaining the expendable device 102 against the structure under test 112, the inspection head 118 may, for example, hold the expendable device 102 or may merely press the expendable device 102 against the structure under test 112. The inspection head 118 may be manually positioned or may be robotically positioned to facilitate automation of a nondestructive bond strength testing method. As shown in FIG. 1, the inspection head may further include wiring 120 for electrically connecting the expendable device 102 to the pulsed-power unit 106.

Figure 2:
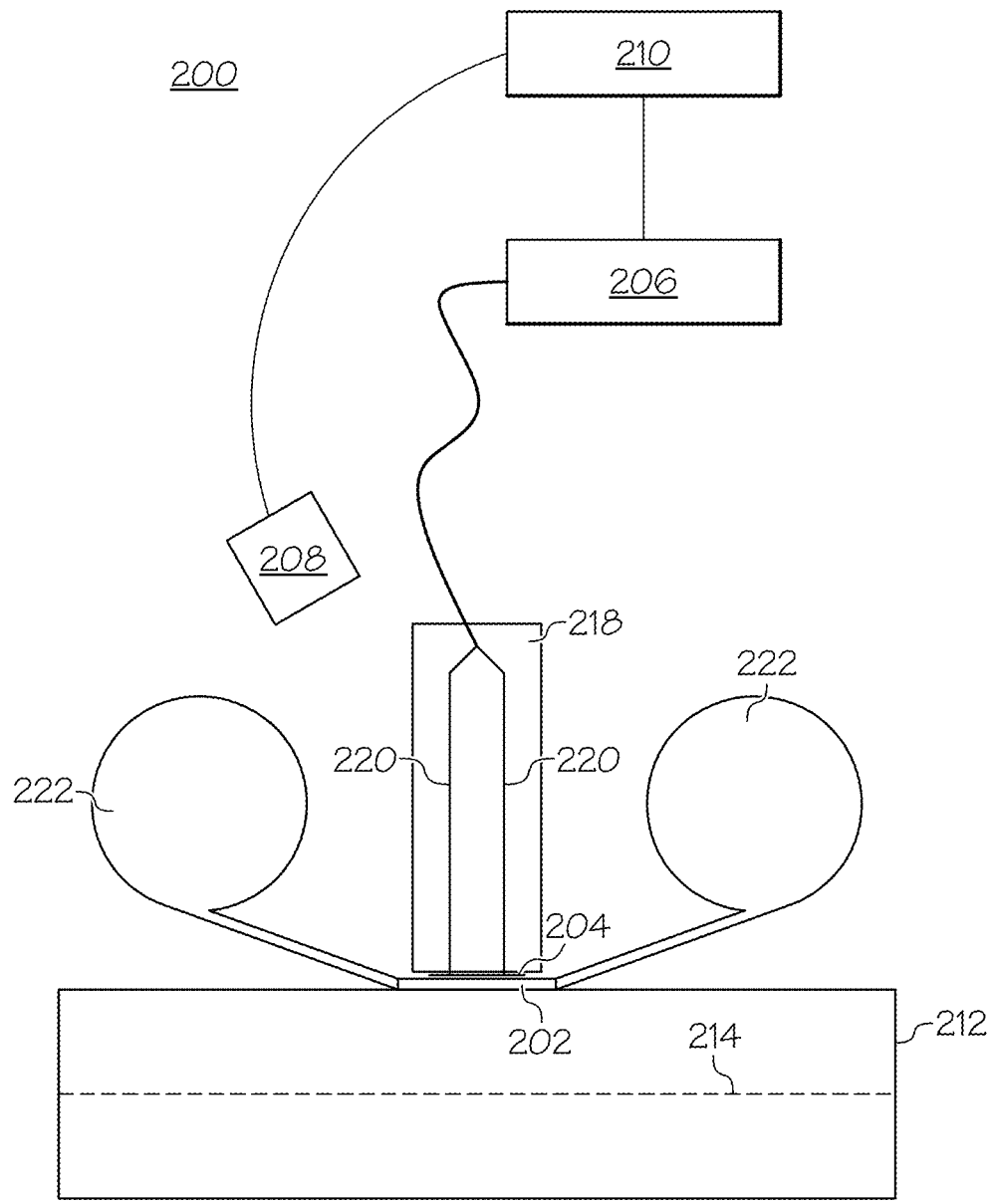
FIG. 2 is a side view of a variation of the nondestructive bond strength testing system according to the present description.

FIG. 2 illustrates a variation of the nondestructive bond strength testing system of FIG. 1. As shown in FIG. 2, the nondestructive bond strength testing system 200 includes an expendable device 202, which includes a patterned planar array of exploding bridge wires 204, on a structure under test 212 having a bond region 214 to be inspected, a pulsed-power unit 206 applying a pulse of electrical energy to a patterned planar array of exploding bridge wires in the expendable device to generate a planar compression wave, a disbond detecting sensor 208, a controller 210, an inspection head 218, and wiring 220.

The nondestructive bond strength testing system 200 of FIG. 2 also includes a reeling system 222 having a plurality of expendable devices thereon, such that a nondestructive bond strength testing method may be more easily automated such as by conducting a first test at a first position on the structure under test using a first expendable device held by the inspection head, thereafter moving the inspection head to a second position on the structure under test, turning the reel to move a second expendable device to the inspection head, and conducting a second test using the second expendable device held by the inspection head at the second position on the structure under test, etc.

Figure 3:
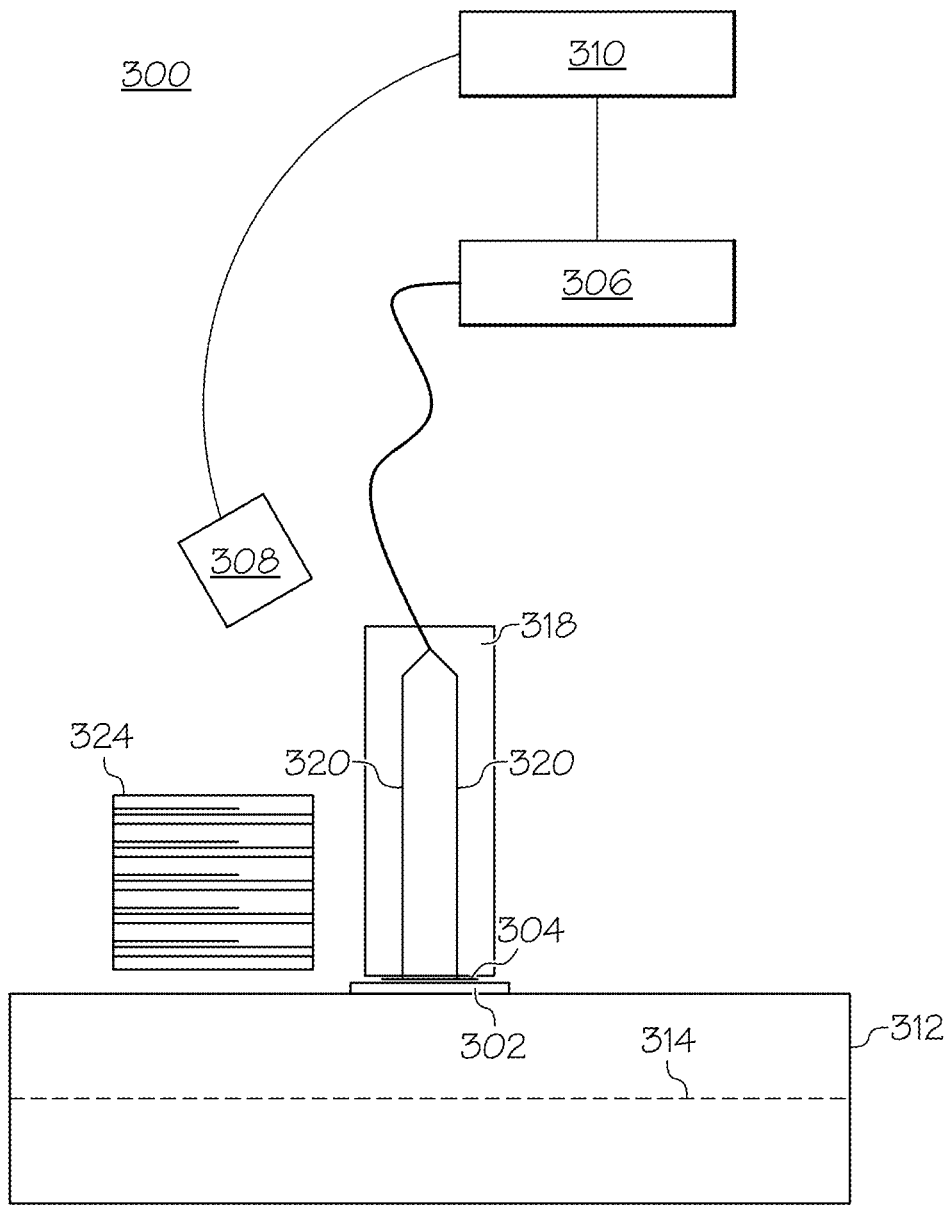
FIG. 3 is a side view of another variation of the nondestructive bond strength testing system according to the present description.

FIG. 3 illustrates another variation of the nondestructive bond strength testing system of FIG. 1. As shown in FIG. 3, the nondestructive bond strength testing system 300 includes an expendable device 302, which includes a patterned planar array of exploding bridge wires 304, on a structure under test 312 having a bond region 314 to be inspected, a pulsed-power unit 306 applying a pulse of electrical energy to a patterned planar array of exploding bridge wires in the expendable device to generate a planar compression wave, a disbond detecting sensor 308, a controller 310, an inspection head 318, and wiring 320.

The nondestructive bond strength testing system 300 of FIG. 3 further includes a dispenser 324 for holding and dispensing a plurality of expendable devices 304, such that a nondestructive bond strength testing method may be more easily automated such as by conducting a first test at a first position on the structure under test using a first expendable device held by the inspection head, thereafter moving the inspection head to a second position on the structure under test, dispensing a second expendable device to the inspection head, and conducting a second test using the second expendable device held by the inspection head at the second position on the structure under test.

Figure 4:
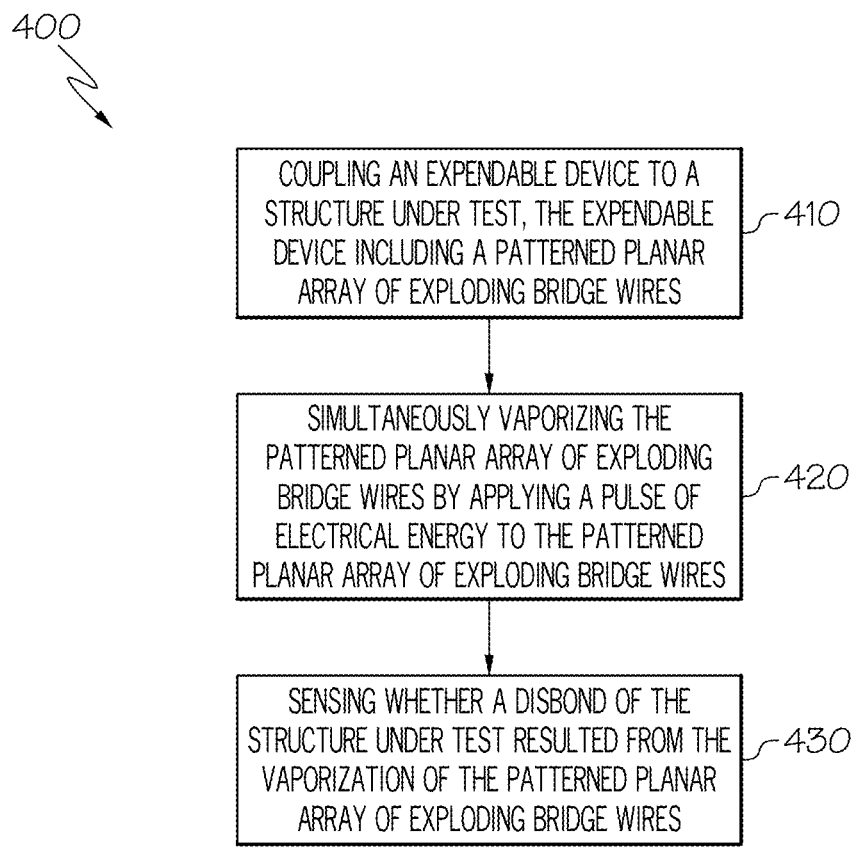
FIG. 4 is a flow chart of a nondestructive bond strength testing method according to the present description.

FIG. 4 relates to a nondestructive bond strength testing method. A bond strength testing method is used to determine the strength of a bonded structure, including both strength in the materials (composite, metallic or hybrid-composite/metallic) which are bonded together and strength in the adhesive material used to create the bond.

FIG. 4 is a flow chart representing a nondestructive bond strength testing method 400 according to the present description including the steps of: at block 410, coupling an expendable device to a structure under test, the expendable device including a patterned planar array of exploding bridge wires; at block 420, simultaneously vaporizing the patterned planar array of exploding bridge wires by applying a pulse of electrical energy to the patterned planar array of exploding bridge wires; at block 430, sensing an initial disbonding signature of the structure under test.

A structure under test may include a first part and a second part which are bonded together at a subsurface bond interface. The first part and second part may be formed from any type of material. For example, materials of one or both of the first part and the second part may be composite material. In other illustrative embodiments, a material of the first part may be a composite while a material of the second part may be a metal, such as titanium.

The bonding between the first part and second part is not limited and may include, for example, bonding by an adhesive, which may be supplemented by adding fasteners. The adhesive may include, for example, film or paste epoxy. The subsurface bond interface is the location where first part and the second part are joined together.

The step of coupling an expendable device to a structure under test 410 may include positioning a coupling material between the expendable device and the structure under test. The coupling material may include, for example, coupling gel. The coupling material adds contact area between the expendable device and a surface of the structure under test by filling in gaps therebetween.

The step of simultaneously vaporizing the patterned planar array of exploding bridge wires by applying a pulse of electrical energy to the patterned planar array of exploding bridge wires 420 generates a planar compression wave and the coupling of the expendable device to a structure under test ensure that the planar compression wave is efficiently transmitted into the structure under test.

As a result of transmitting the planar compression wave into the structure under test, the compression wave generated propagates through the structure under test to another surface so that the compression wave reflects from the second surface as a tension wave, which applies a tensile stress to the characteristic material bonding strength to be inspected. If the strength of the bonding is weak, then the tensile stress applied by the tension wave causes a disbonding onset signature of the material.

By controlling the size and amount of exploding bridge wires in the patterned planar array of exploding bridge wires and the amount of electrical energy applied to the array, the bond strength testing method permits for a broad range of energies that can be selected. Precise control of the energy of the resulting planar compression wave transmitted into the structure under test may be chosen by adjusting the energy applied to the exploding bridge wires. Adjusting the energy applied may be selected by adjusting a voltage applied to a capacitor and/or the size (capacitance) or number of capacitors in a capacitor bank. In this case, stored energy is $\frac{1}{2}CV^2$. Thus, the bond strength testing method provides for a broad range of energies that can be selected and precise control of the energy applied to the exploding bridge wires.

Alternatively, rather than changing the size and amount of the exploding bridge wires, a multiple expendable device of the same size and configuration may form planar compression waves having different characteristics by adjusting the characteristics of the pulse of electrical energy received from the pulsed-power unit. For example, by changing the inductance and thus the timing of the electrical discharge, a waveform of the resulting planar compression wave may be stretched or compressed in time, and thus a resulting tensile force applied to the inspected bond region of the structure under test may be controlled by the characteristics of the pulse of electrical energy received from the pulsed-power unit.

The step of sensing an initial disbonding signature of the structure under test may include detecting a characteristic signature of a disbond formed in the inspected bond region. The detection may occur independently from the disbonding itself, such as by way of ultrasound, x-rays, or acoustics, or the step of sensing an initial disbonding signature of the structure under test may detect the disbonding simultaneously with the disbonding such as by way of a surface motion detector that detects and measures the surface motions, which may then be correlated to the pulse of electrical energy applied to determine whether the inspected bond region failed as a result of the induced stress. The surface motion detector may detect resultant tension waves by a VISAR (Velocity Interferometer System for Any Reflector) device, which measures velocity on the surface of structure under test. From the velocity data, translaminar tension loads may be determined, along with an internal failure of the structure under test.

The step of coupling the expendable device to the structure under test may include manually positioning the expendable device to the structure under test or may include robotically positioning the expendable device to facilitate automation of a nondestructive bond strength testing method.

FIGS. 5 to 8 illustrate exemplary expendable devices that may be employed with the nondestructive bond strength testing systems and methods. Advantages of the expendable devices of the present description include a low cost for producing the expendable devices, the expendable devices are self-contained, automated on-line nondestructive evaluation is enabled, uses controlled, localized stress waves for the evaluation of bonded joints, controlled stress waves of sufficient explosive yield to evaluate bonds can be reliably and repeatedly generated, no sample heating takes place thus there is no surface damage, vaporization produces locally high pressure for which pulse duration can be tailored to a few hundreds of a nanosecond, and not restricted to sample size.

Figure 5:
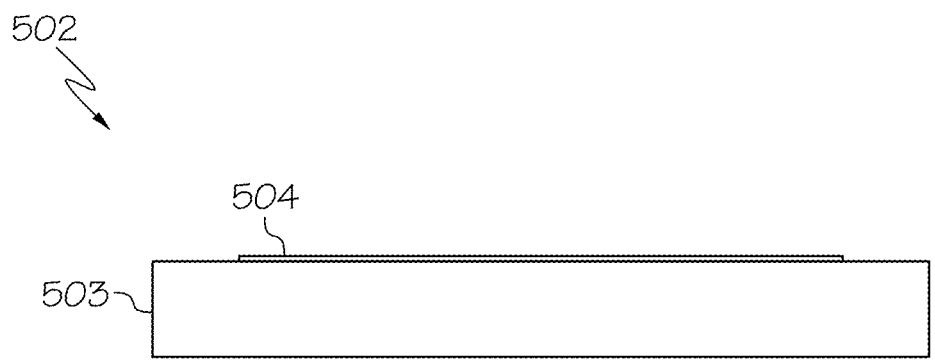
FIG. 5 is a side view of an expendable device according to the present description.

As shown in FIG. 5, a single layer expendable device 502 includes a substrate 503, such as a fiberglass substrate, and a patterned planar array of exploding bridge wires 504 formed on the substrate 503. Although the expendable device is a single layer substrate having a patterned planar array of exploding bridge wires 504 formed thereon, the nondestructive bond strength testing system and method may include placing another structure, e.g., board, on top of the expendable device 502 to confine the plasma generated by the patterned planar array of exploding bridge wires 504. The structure on top of the single layer expendable device may be the holder that helps clamp the expendable device to the structure under test.

Figure 6:
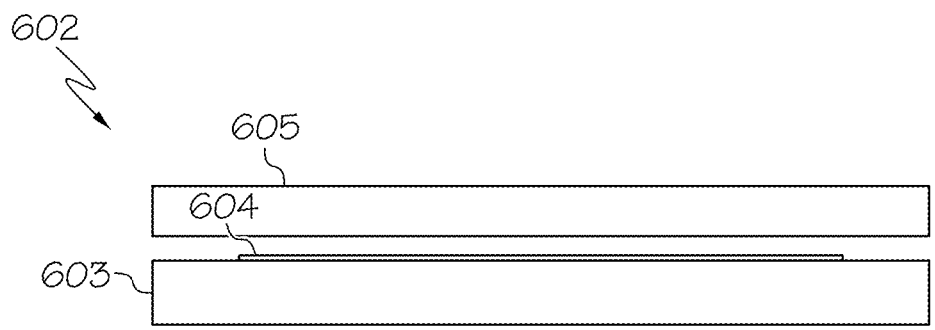
FIG. 6 is a side view of a variation of the expendable device according to the present description.

FIG. 6 illustrates an exemplary multilayer expendable device that may be employed with the nondestructive bond strength testing systems and methods. As shown in FIG. 6, the expendable device 602 includes a substrate 603, such as a fiberglass substrate, a patterned planar array of exploding bridge wires 604 formed on the substrate 603, and a tamping layer 605. In an aspect, the tamping layer may be thinner than substrate 603.

By using the multilayer expendable device with the patterned planar array of exploding bridge wires 604 buried on an internal surface of the expendable device, an amplification effect is provided. The amplification effect is analogous to a laser bond inspection method is which a water layer or some other transparent layer is usually applied over the ablative surface (e.g., tape or paint). The purpose of the transparent over layer being to act as a tamping layer which confines the outwardly expanding plasma generated at the surface and significantly amplifies (10x-20x) the planar compression wave into the structure under test so produced. Returning to FIG. 6, the tamping layer 605 above the patterned planar array of exploding bridge wires 604 should be thinner than the substrate 603 coupled with the structure under test so that the tamping layer 605 is selected to be the side that fails and blows outwards after the patterned planar array of exploding bridge wires 604 are vaporized upon application of a pulse of electrical energy from the pulsed-power unit.

Figure 7:
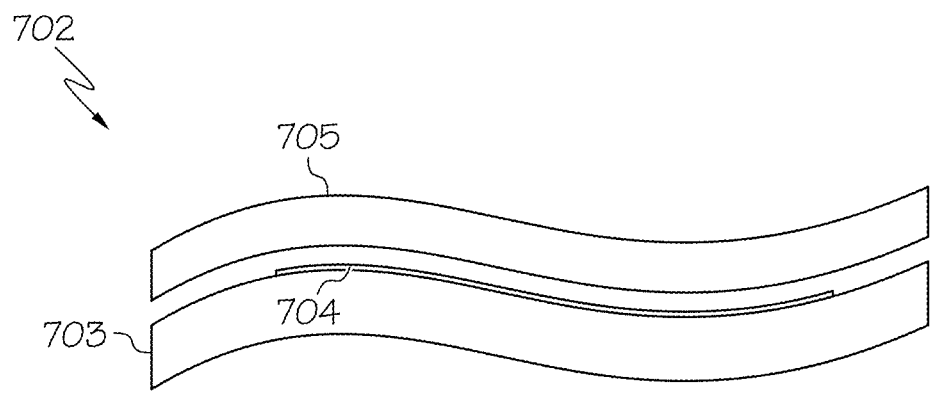
FIG. 7 is a side view of another variation of the expendable device according to the present description.

FIG. 7 illustrates an exemplary flexible multi-layer expendable device that may be employed with the nondestructive bond strength testing systems and methods. As shown in FIG. 7, the expendable device 702 includes a flexible substrate 703, such as kapton, a patterned planar array of exploding bridge wires 704 formed on the substrate 703, and a tamping layer 705. In an aspect, the tamping layer may be polyvinyl chloride. The flexible multi-layer expendable device may find particular utility when used with a supply/uptake spool system such as illustrated in FIG. 2.

Figure 8:
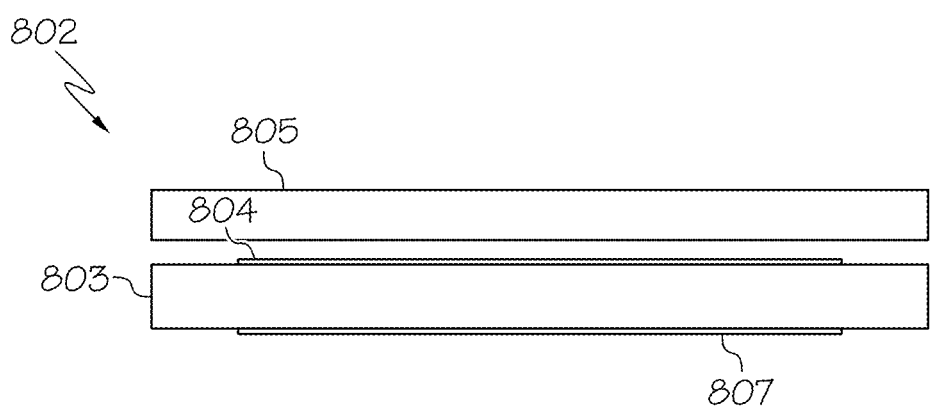
FIG. 8 is a side view of yet another variation of the expendable device according to the present description.

FIG. 8 illustrates an exemplary multilayer expendable device that includes a shielding layer. As shown in FIG. 8, the expendable device 802 includes a substrate 803, such as a fiberglass substrate, a patterned planar array of exploding bridge wires 804 formed on the substrate 803, a tamping layer 805, and a shielding layer 807. The shielding layer 807 acts as a ground plane on the outside (lower surface) of the expendable device 802 to shield surrounding structure from electromagnetic interference generated by the current surge. Alternatively, the shielding layer could be part of the inspection head.

To be useful for a nondestructive bond strength testing method of the present description, the patterned planar array of exploding bridge wires includes a set of conducting traces that are fixed or bonded to a substrate such as a circuit board. The conducting traces fire together so that a planar compression wave generated by each conductive trace adds with its neighbor to form a planar compression wave.

The expendable device includes terminals to apply the pulsed power to the bridge wires, metallizations, some that route the pulsed power to the bridge wires and some that act as the bridge wires, and various non-metal underlayers and overlayers to the metallization. The bridge wires are arranged in an array to create a more uniform compression wave over area into the device under test. There may be more than one layer of metallizations in the bridge wire array. The non-metal underlayers and overlayers to the bridge wire array aid in directing the resulting planar compression waves generated, and provide the structure and packaging of the test expendables. The metal bridge wire layer(s) are sandwiched between and in contact with a non-metal underlayer and an overlayer.

The total mass of the patterned planar array of exploding bridge wires (see, for example, FIGS. 9 to 11) is chosen to efficiently absorb energy from a capacitive electric energy store and to convert this to a compression wave near the peak of the energy transfer via vaporization, such that the energy transfer to the vaporization state is near optimal. The total mass of the patterned planar array of exploding bridge wires is divided among several individual electrical sub-paths between the terminals and spread across the surface of the expendable device, such that the synchronization of the compression waves formed at each electrical sub-path forms an overall compression wave into the device or material under test that is strong and uniform across the surface. This generally requires that the pulsed power applied to the primary terminals propagates to each sub-path in synchronous fashion initially, even before the strong electric current rise begins. The distribution of mass among the metal overlayers is made so that the ratio of the electrical pulsed-inductance along the i'th individual sub-path (denoted by Li), to the electrical resistance of the individual path (denoted by Ri) forms an equivalent propagation time that is longer than the uncertainty time in the conversion of any one metallization path from a solid to vaporization state. For example, if the application of a high voltage in the form of a pulsed power current across the expendable terminals generally results in a vaporization of one path in the division of metallization paths in about 15 microseconds to 18 microseconds, then the expendable would be designed such that Li/Ri for any of the 'i' paths greater than 3 microseconds. The purpose of this consideration is to maintain the uniformity in the detonation of each of the metal overlayers paths in the expendable, such that the changing electrical voltage and current due to the vaporization of the first sub-path is not communicated to the other sub-paths faster than the time necessary for each independent response to the initial pulsed power energy.

The individual bridge wire sub-paths may be arranged lined up side-by-side and in the same plane, with the applied pulsed power distributing initially across each of the sub-paths nearly equally, and each Li/Ri time balanced against the time dispersion to vaporization due to the total metallization mass and pulsed power voltage applied. The bridge wire sub-paths may also be arranged in a radial fashion, with one of the primary terminals being the center of the radial pattern, or fed to an outside terminal on the edge of the corresponding structure such that the sub-paths in the radial pattern are each initially affected by the application of the pulsed power nearly equally.

The individual bridge wire sub-paths may be arranged such that one or more sub-paths may vaporize and create a corresponding compression wave before the others, located in a separate plate away from the device under test such that the time of arrival of all of the compression waves from all of the individual bridge wires is still in synchronicity at the device or structure under test.

Figure 9:
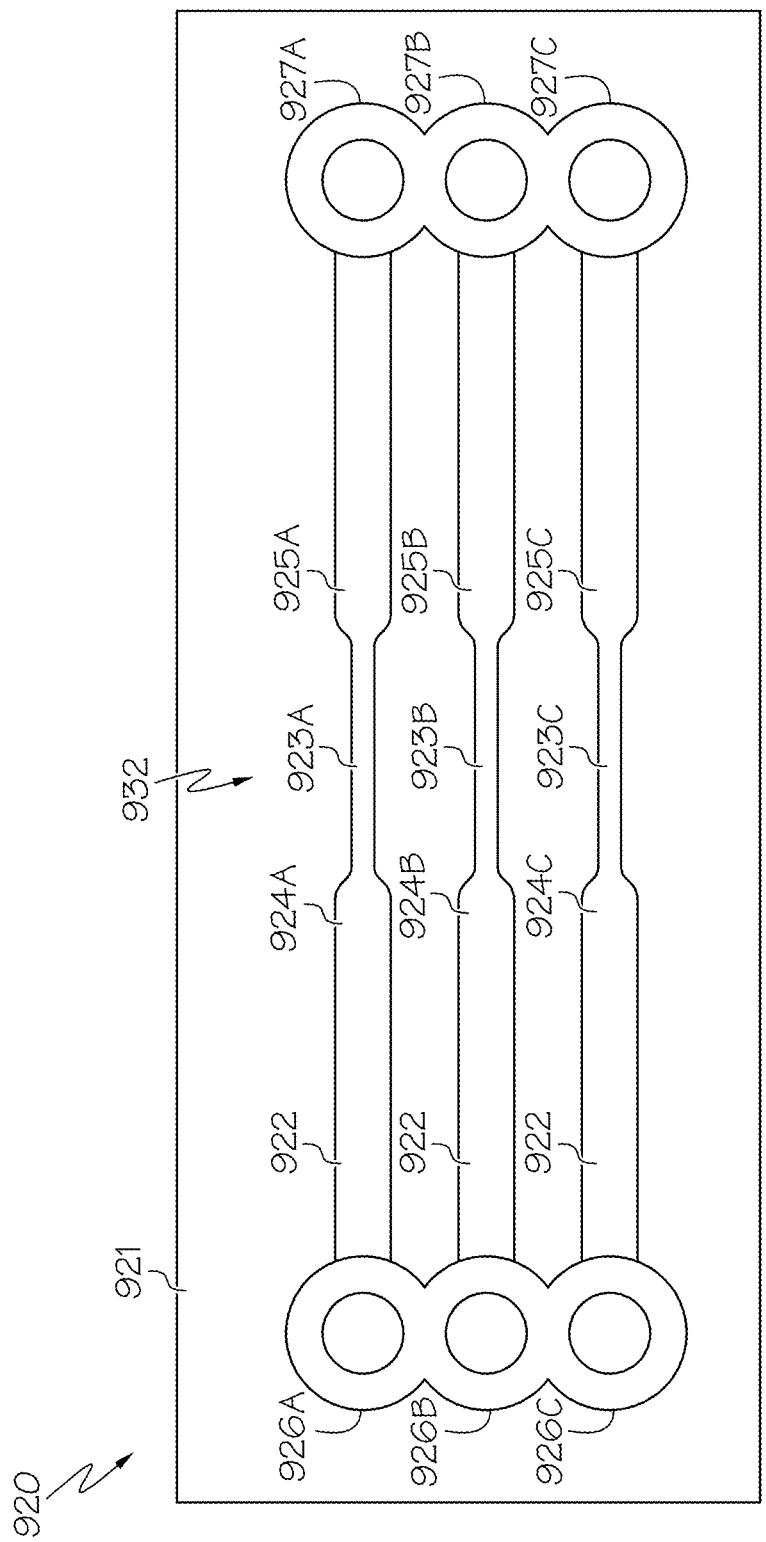
FIG. 9 is a top view of a patterned planar array of exploding bridge wires included with an expendable device according to the present description.
Figure 10:
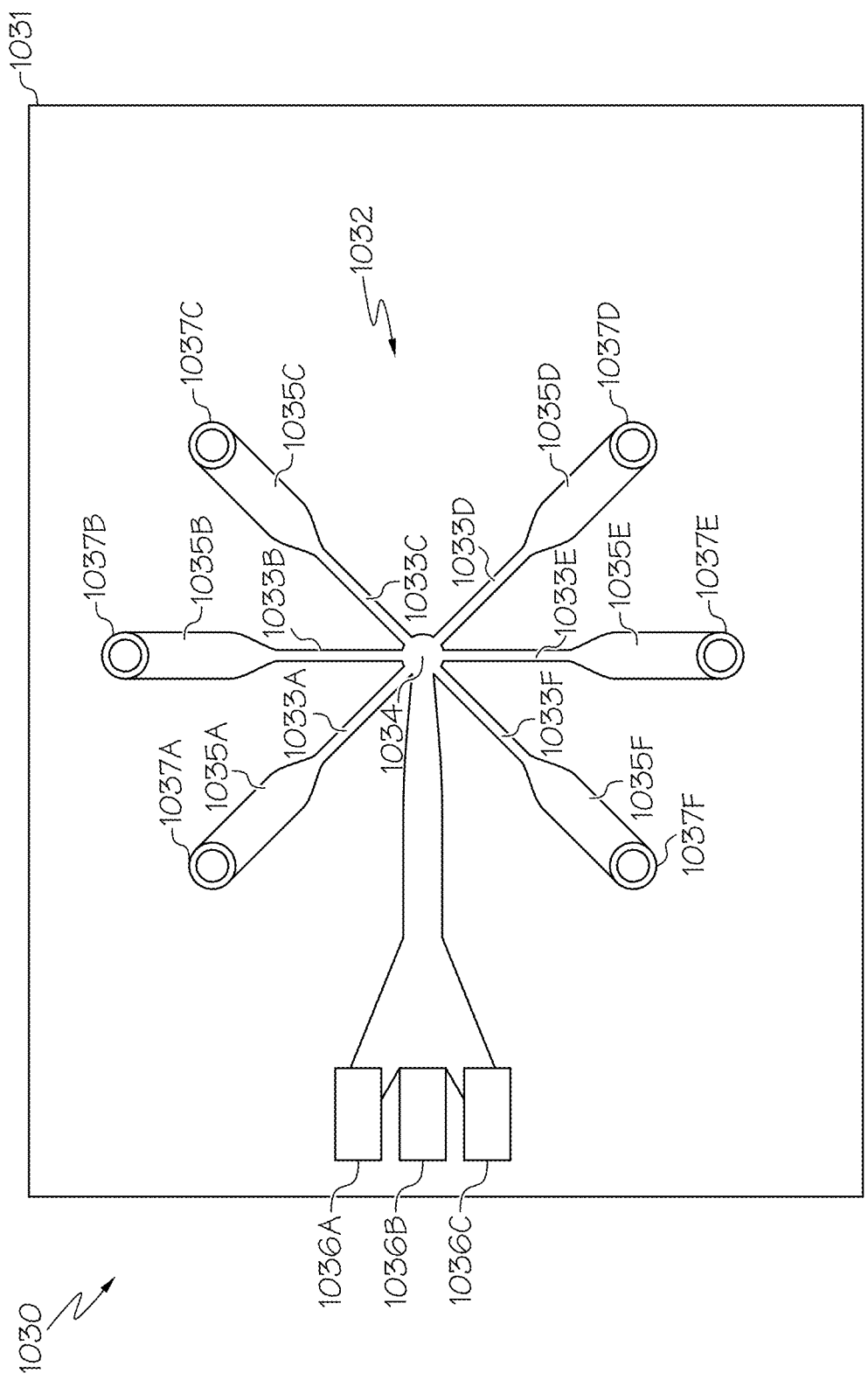
FIG. 10 is a top view of another patterned planar array of exploding bridge wires included with an expendable device according to the present description.
Figure 11:
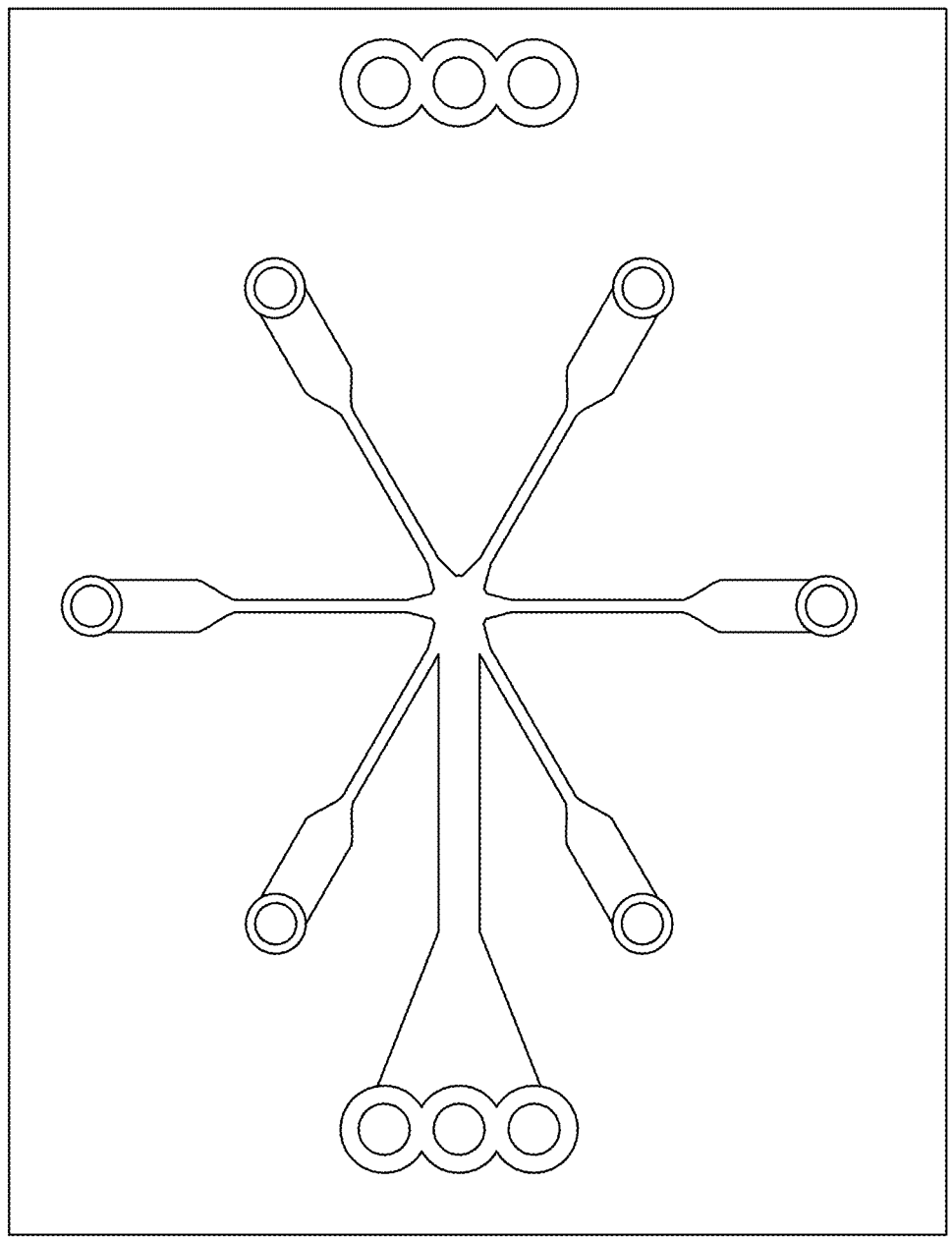
FIG. 11 is a top view of yet another patterned planar array of exploding bridge wires included with an expendable device according to the present description.

With reference to FIGS. 9 to 11, exemplary arrangements of a patterned planar array of exploding bridge wires on an expendable device are explained in further detail.

As shown in FIGS. 9 to 11, the expendable devices each include an insulating substrate and a patterned planar array of exploding bridge wires on the insulating substrate, the patterned planar array of exploding bridge wires having a plurality of exploding bridge portions.

The patterned planar array of exploding bridge wires further includes a first shoulder portion and a second shoulder portion on opposing sides of each exploding bridge portion, wherein the exploding bridge portion connects the first shoulder portion and the second shoulder portion.

Each exploding bridge portion has a reduced cross-sectional area relative to the first and second shoulder portions. Reducing the cross-sectional area of the exploding bridge portion relative to the shoulder portions defines the portion of the patterned planar array of exploding bridge wires that will receive the highest current density and thereby vaporize to create the planar compression wave.

As shown in FIGS. 9 to 11, the expendable devices each includes at least a first terminal and at least a second terminal connected at opposing ends of the patterned planar array of exploding bridge wires for connecting to a source of electrical energy.

The length of the exploding bridge portion may be selected to control a location of an origin of the planar compression wave. For example, a maximum length of the exploding bridge portion may be less than 2 cm, preferably less than 1 cm, and a minimum length of the exploding bridge portion may be more than 0.01 cm, preferably more than 0.1 cm, more preferably more than 0.5 cm.

In an aspect, the insulating substrate may be formed from glass epoxy, such as FR-4 60 mil circuit board.

In an aspect, the patterned planar array of exploding bridge wires may be formed from a metal, such as copper, aluminum, iron, tungsten, or lead.

In an aspect, the expendable device may be formed from a single layer board between two layers of conductors. In other aspects, the expendable device may be formed in a multilayer circuit board approach.

The patterned planar array of exploding bridge wires may be patterned on the insulating substrate by any suitable method, such as by silk screen printing, photoengraving, printed circuit board (PCB) milling, and laser resist ablation.

FIG. 9 illustrates an exemplary expendable device 920 for creating a fast rise-pulse planar compression wave, the expendable device including an insulating substrate 921, a patterned planar array of exploding bridge wires 922 on the insulating substrate, the patterned planar array of exploding bridge wires having a plurality of exploding bridge portions 923A, 923B, 923C connected in parallel and patterned on the insulating substrate in an arrangement of a linear array.

The patterned planar array of exploding bridge wires further includes, for each exploding bridge portion, a first shoulder portion 924A, 924B, 924C and a second shoulder portion 925A, 925B, 925C separated from the first shoulder portion, wherein the exploding bridge portion connects the first shoulder portion and the second shoulder portion. As shown, the first shoulder portion is separate for each exploding bridge portion, and the second shoulder portion is separate for each exploding bridge portion. In other aspect, one or more of the first shoulder portions may be shared for the respective exploding bridge portions, and one or more of the second shoulder portions may be shared for the respective exploding bridge portions.

As shown in FIG. 9, the expendable device further includes a first set of terminals 926A, 926B, 926C and a second set of terminals 927A, 927B, 927C connected at opposing ends of the patterned planar array of exploding bridge wires for connecting to a source of electrical energy. In other aspects, the expendable device may include a single first terminal and a single second terminal connected at opposing ends of the patterned planar array of exploding bridge wires.

FIG. 10 illustrates another exemplary expendable device 1030 for creating a fast rise-pulse planar compression wave, the expendable device including an insulating substrate 1031, a patterned planar array of exploding bridge wires 1032 on the insulating substrate, the patterned planar array of exploding bridge wires having a plurality of exploding bridge portions 1033A, 1033B, 1033C, 1033D, 1033E, 1033F connected in parallel and patterned on the insulating substrate in an arrangement of a radial array.

The patterned planar array of exploding bridge wires further includes, for each exploding bridge portion, a first shoulder portion 1034 and a second shoulder portion 1035A, 1035B, 1035C, 1035D, 1035E, 1035F separated from the first shoulder portion, wherein the exploding bridge portion connects the first shoulder portion and the second shoulder portion. As shown, the first shoulder portion is shared for all the exploding bridge portions, and the second shoulder portion is separate for each exploding bridge portion. Feeding the conduction path through the circuit board to underlying layer(s) and to the return path of the electrical source current. In other aspect, the first and second and shoulder portions may be any combination of shared or separate shoulder portions.

As shown in FIG. 10, the expendable device further includes a first set of terminals 1036A, 1036B, 1036C and a second set of terminals 1037A, 1037B, 1037C, 1037D, 1037E, 1037F connected at opposing ends of the patterned planar array of exploding bridge wires for connecting to a source of electrical energy. In other aspects, the expendable device may include other arrangements of terminals, including a single first terminal and a single second terminal connected at opposing ends of the patterned planar array of exploding bridge wires.

FIG. 11 illustrates yet another exemplary expendable device having a plurality of exploding bridge portions connected in parallel and patterned on the insulating substrate in a different radial arrangement from that of FIG. 10.

The arrangements of the plurality of exploding bridge portions are not limited to a linear or radial array, but may include any arrangement of the plurality of exploding bridge portions. Preferably, the plurality of exploding bridge portions are arranged in a pattern that provides for a substantially uniform planar compression wave over on area of the expendable device covered by the plurality of exploding bridge portions. Arranging the bridge portions permits for an option to expand the number of exploding bridge wires of the same size in a pattern, not necessarily to increase the size of each exploding bridge wire. The use of a pattern gives two options. One is to increase the area that experiences the compression/tension wave on/in the structure under test. The other is to allow phasing of the compression/tension waves to permit a test at a specific location on/in the structure under test.

In an aspect, the exploding bridge portions have reduced cross-sectional area relative to the respective first and second shoulder portions. Reducing the cross-sectional area of the exploding bridge portions relative to the shoulder portions defines the portions of the patterned planar array of exploding bridge wires that will receive the highest current density and thereby vaporize to create the planar compression wave.

The length of the exploding bridge portions may be selected to control a location of an origin of the compression wave. For example, a maximum length of the exploding bridge portions may be less than 2 cm, preferably less than 1 cm, and a minimum length of the exploding bridge portion may be more than 0.01 cm, preferably more than 0.1 cm, more preferably more than 0.5 cm. In an aspect, each of the exploding bridge portions may have the same length.

Typical volumes of an exploding bridge portion scale with a gauge of the structure under test. A 1 cm laser beam may be excellent for a 1 cm structure under test.

The combined mass of the plurality of exploding bridge portions may be selected to control an explosive yield. For example, a maximum combined mass of the plurality of exploding bridge portions may be less than 100 milligrams, preferably less than 10 milligrams, more preferably less than 5 milligrams, and a minimum combined mass of the plurality of exploding bridge portions may be more than 0.01 milligrams, preferably more than 0.1 milligrams, more preferably more than 0.5 milligrams. In an aspect, each of the exploding bridge portions may have the same mass.

The explosive yield of the patterned planar array of exploding bridge wires may be selected to control a strength of a compression wave. For example, the patterned planar array of exploding bridge wires may have a combined explosive yield of 100 $J/cm^2$ or less, preferably 50 $J/cm^2$ or less, more preferably 10-40 $J/cm^2$. Minimum combined energy densities may be more than 0.1 $J/cm^2$, preferably more than 1 $J/cm^2$.

Figure 12A:
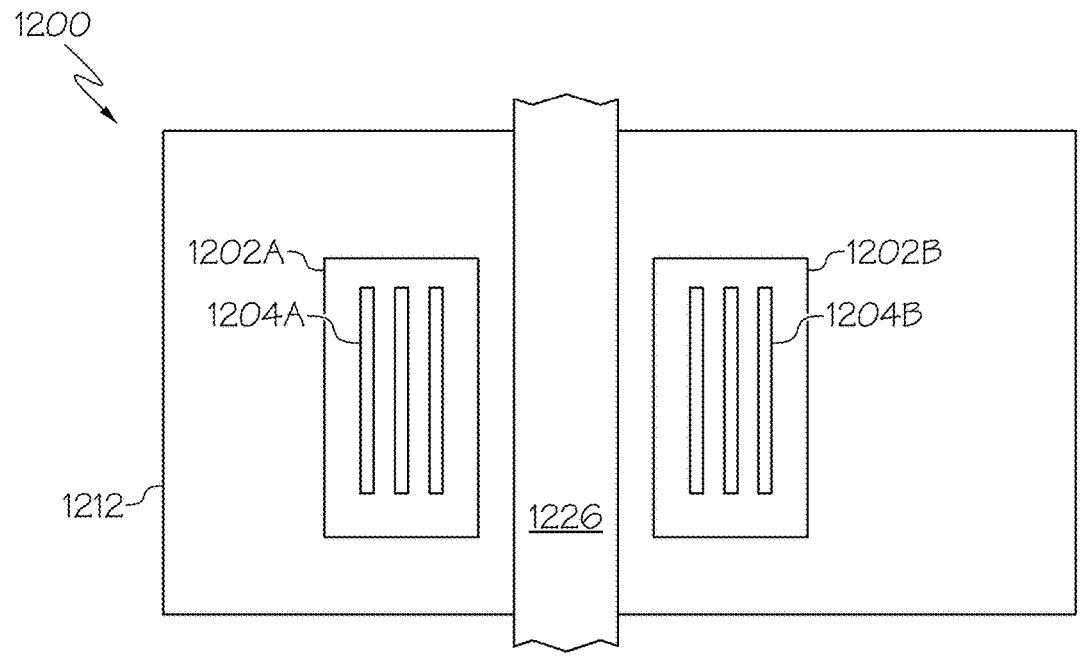
FIGS. 12A and 12B illustrate a variation of a nondestructive bond strength testing system and method.
Figure 12B:
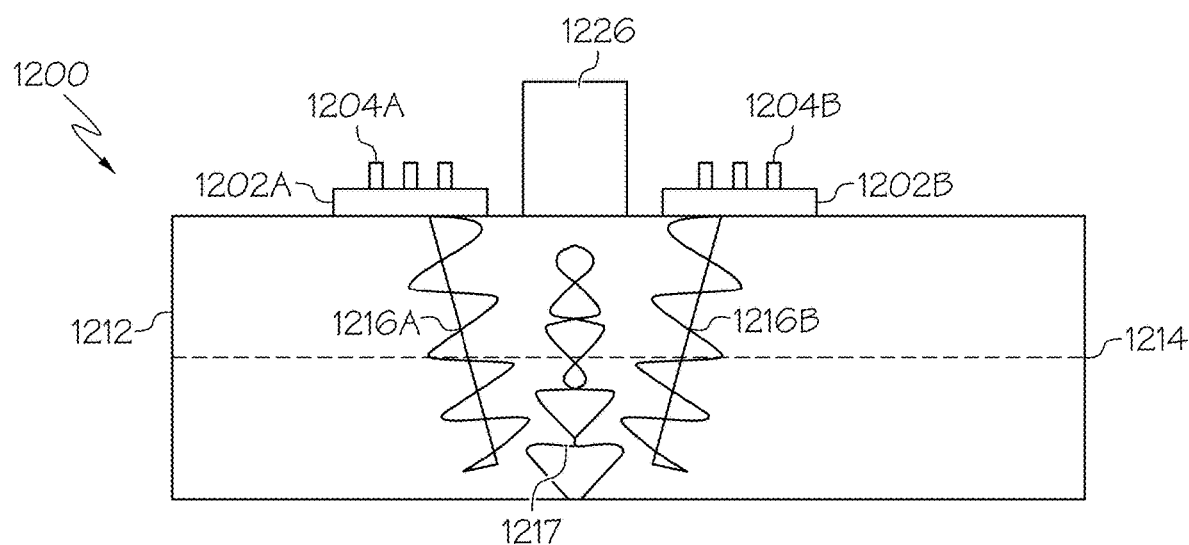
Figure 13:
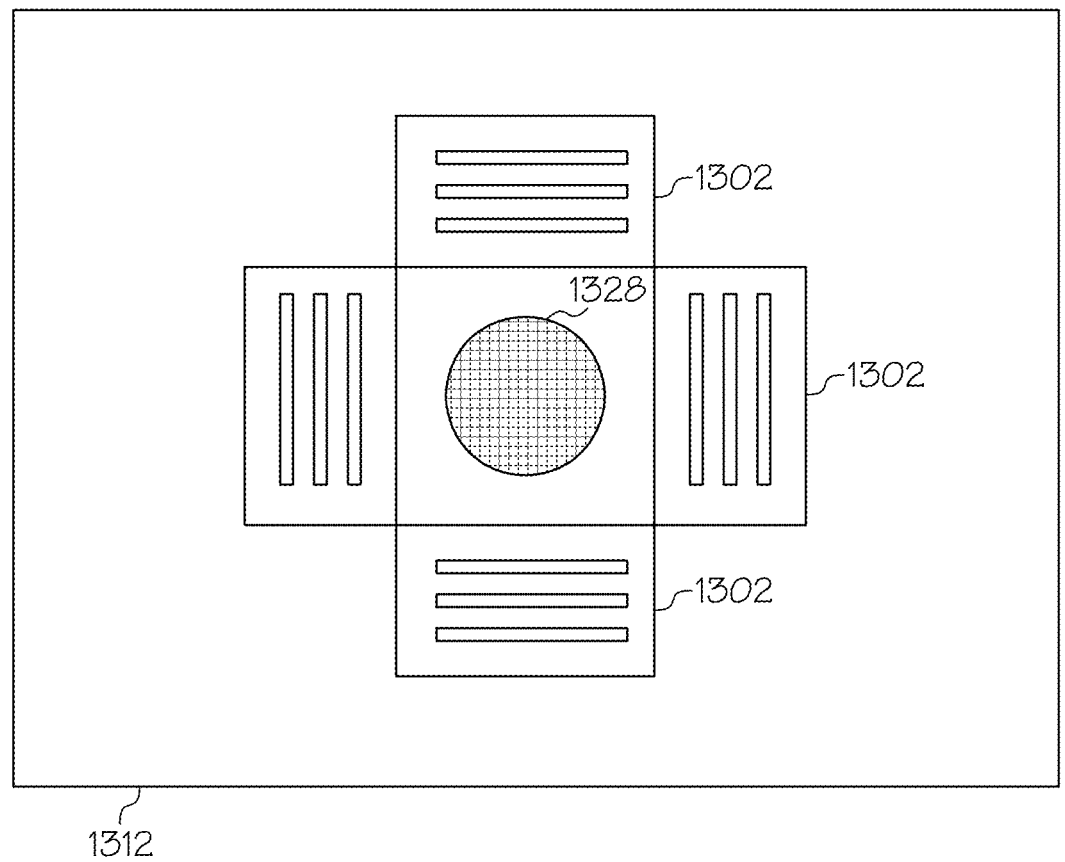
FIG. 13 illustrates another variation of a nondestructive bond strength testing system and method.

FIGS. 12A and 12B and FIG. 13 illustrate variations of a nondestructive bond strength testing system and method.

In FIGS. 12A and 12B, the nondestructive bond strength testing system is configured to test a bond strength at an obstructed interface. As shown in FIGS. 12A and 12B, the nondestructive bond strength testing system 1200 including a first expendable device 1202A, which includes a first patterned planar array of exploding bridge wires 1204A and a second expendable device 1202B, which includes a second patterned planar array of exploding bridge wires 1204B, in which first expendable device 1202A and second expendable device 1202B are coupled to the structure under test 1212 at opposing side of an obstruction 1226. As shown, a first compression wave 1216A is generated by the first expendable device 1202A, and a second compression wave 1216B is generated by the second expendable device 1202B. The first and second compression wave travel through the structure under test 1212 and reflect from a back surface to form a combined tensile wave the portion of the bond interface behind the obstruction 1226.

FIG. 13 illustrates a variation in which a laser 1328 is used in conjunction with the multiple planar arrays of exploding bridge wires 1302 coupled to a structure under test 1312. There is an issue with an annular array or a radial array and that is that the compression wave must propagate some distance and spread as it propagates in order to begin to overlap and phase together. This means that a weak element in the structure under test right under the center of the array and near the top surface may not be sufficiently interrogated by now overlapping compression/tension waves from the radial struts. The two methods could be combined with a laser used on axis combined with the radial or annular array. This would allow inspection/interrogation of the structure under test both near the surface and deeper into the structure. By way of combining a laser with the multiple planar arrays of exploding bridge wires, testing over a much larger area is permitted and phasing different compression waves (using constructive interference) is enabled.

Figure 14:
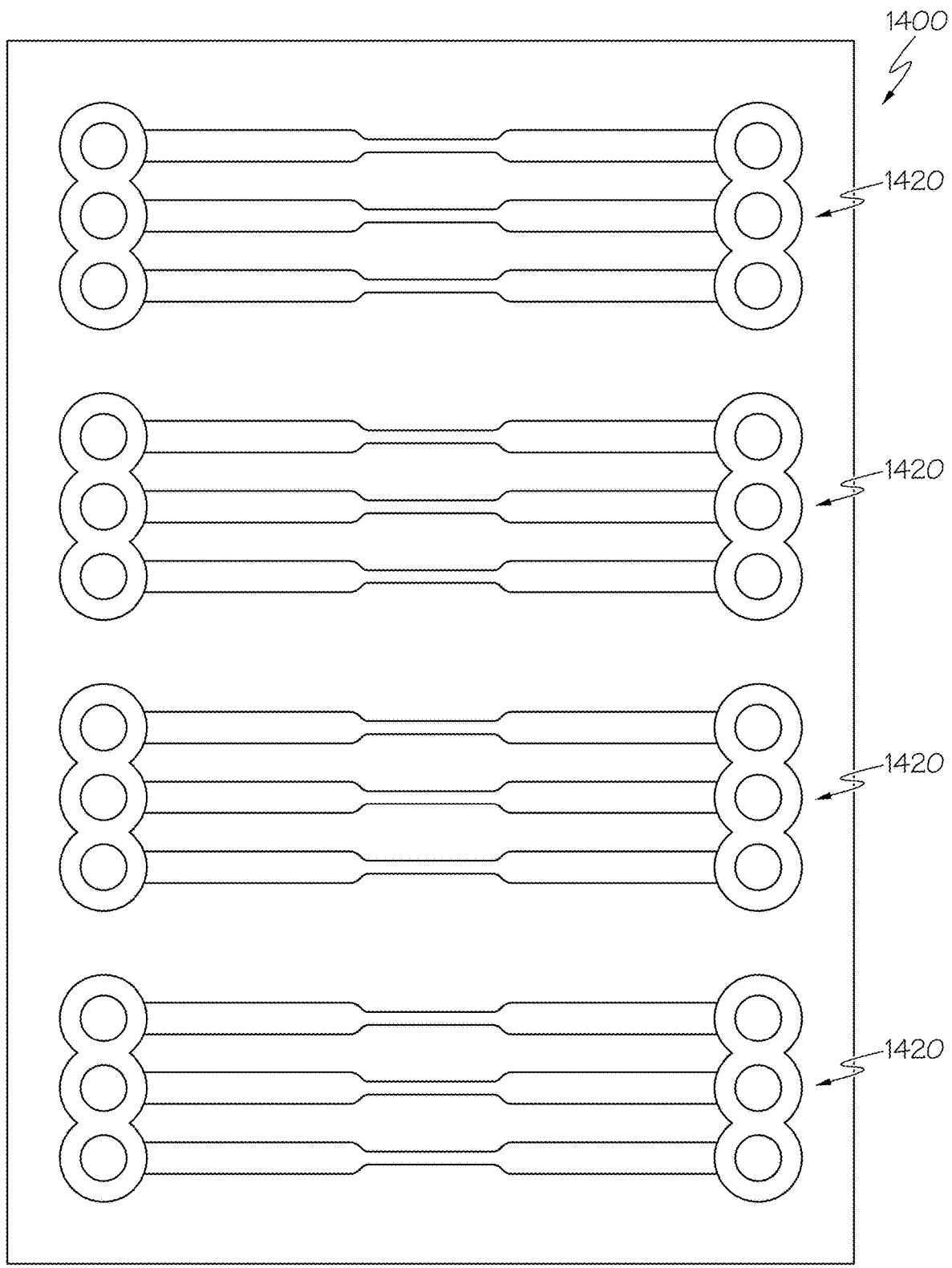
FIG. 14 is a panel including a plurality of the devices of FIG. 9.

FIG. 14 illustrates a panel 1400 including a plurality of the expendable devices 1420 as illustrated in FIG. 9. As represented by FIG. 14, several expendable devices for creating a fast rise-pulse compression wave may be fabricated at the same time on a same panel and then cut apart and utilized separately.

A feasibility study has been performed to match an exploding bridge conductor to available values of capacitance, inductance, resistance and initial high voltage that would (1) match available configurations of a high voltage test lab pulser, (2) create a liquid and vapor phase transition in copper within the first ¼ cycle of an LRC oscillation in current, (3) create a liquid to vapor phase transition that is comparable to a desired pulse width limit on the compression pulse (a microwave second or less), and (4) drive an exploding bridge conductor resulting in a synchronous compression wave over a 1 cm$^2$ area.

Exploding bridge conductors formed from a number of metal conductors were modeled, according to their published material properties as a function of impulse-deposition energy. Typical modeled results are shown in FIG. 15 through FIG. 20.

Figure 15:
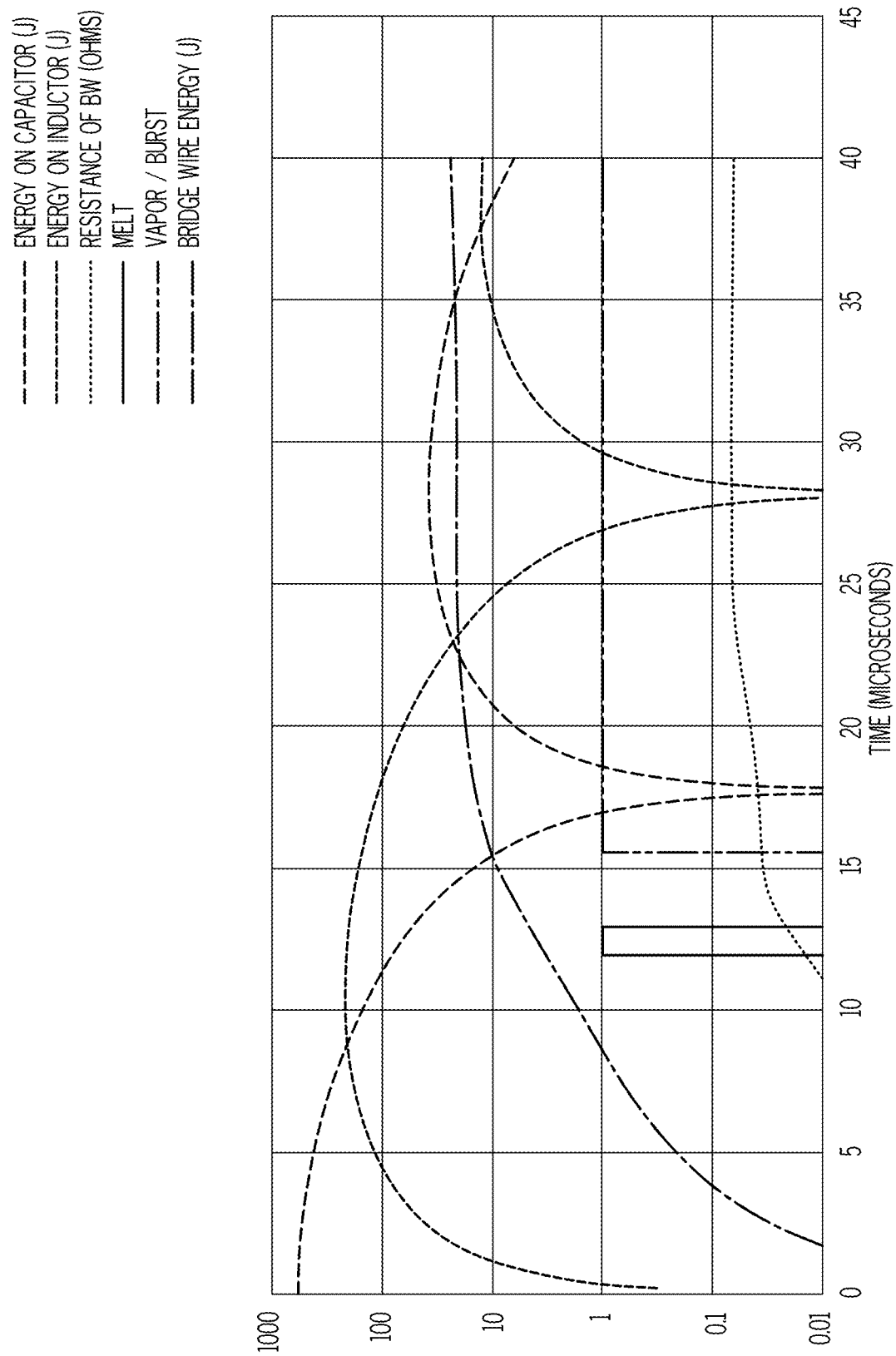
FIGS. 15-20 show modeled results for a copper exploding bridge conductor.

FIG. 15 relates to modeled results for a copper exploding bridge conductor having a 28-gauge equivalence, with a test pulser configuration of 14 uF, 450 mOhm, 5 uH, 9 kV charge voltage.

Figure 16:
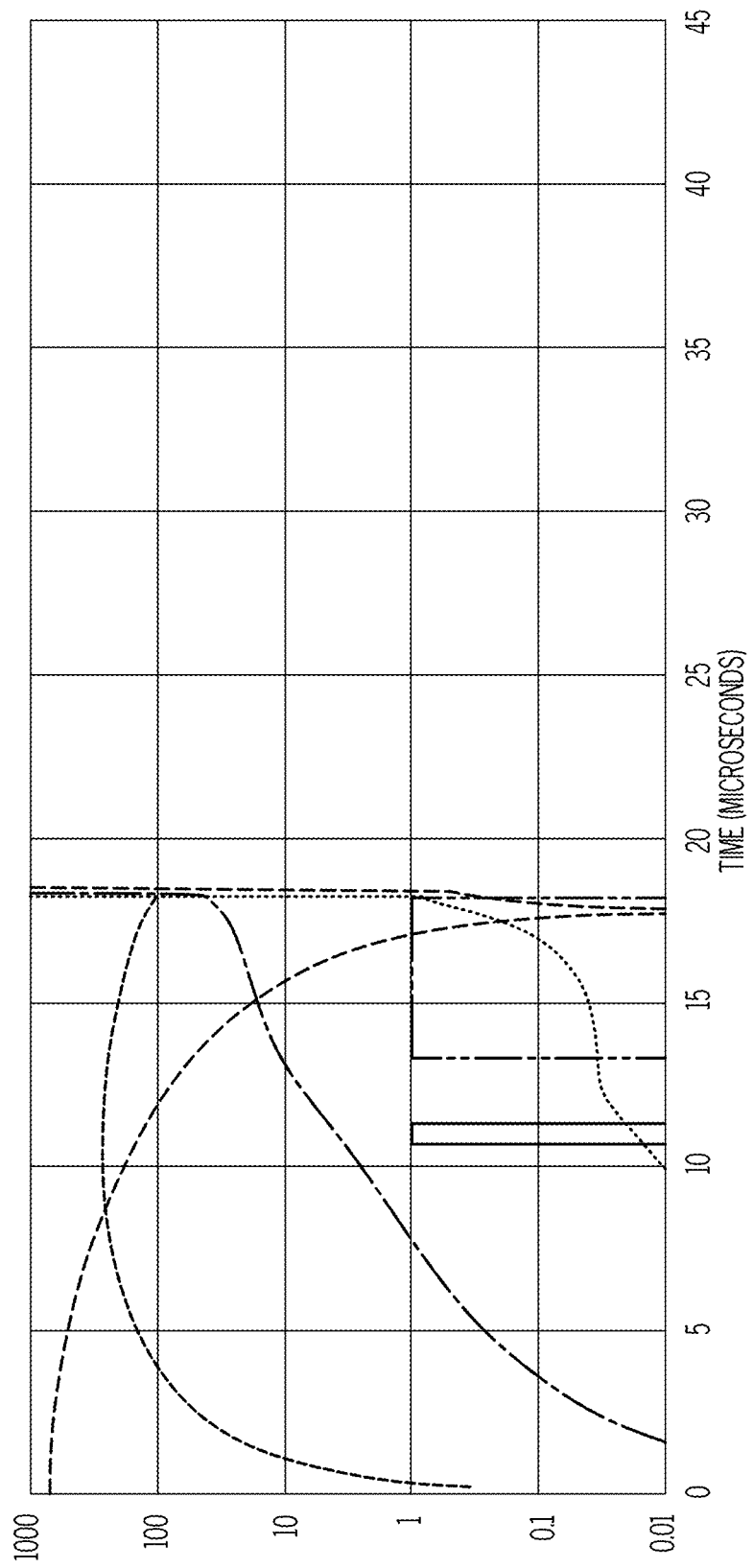

FIG. 16 relates to modeled results for a copper exploding bridge conductor having 28-gauge equivalence, with a test pulser configuration of 14 uF, 450 mOhm, 5 uH, 10 kV charge voltage.

Figure 17:
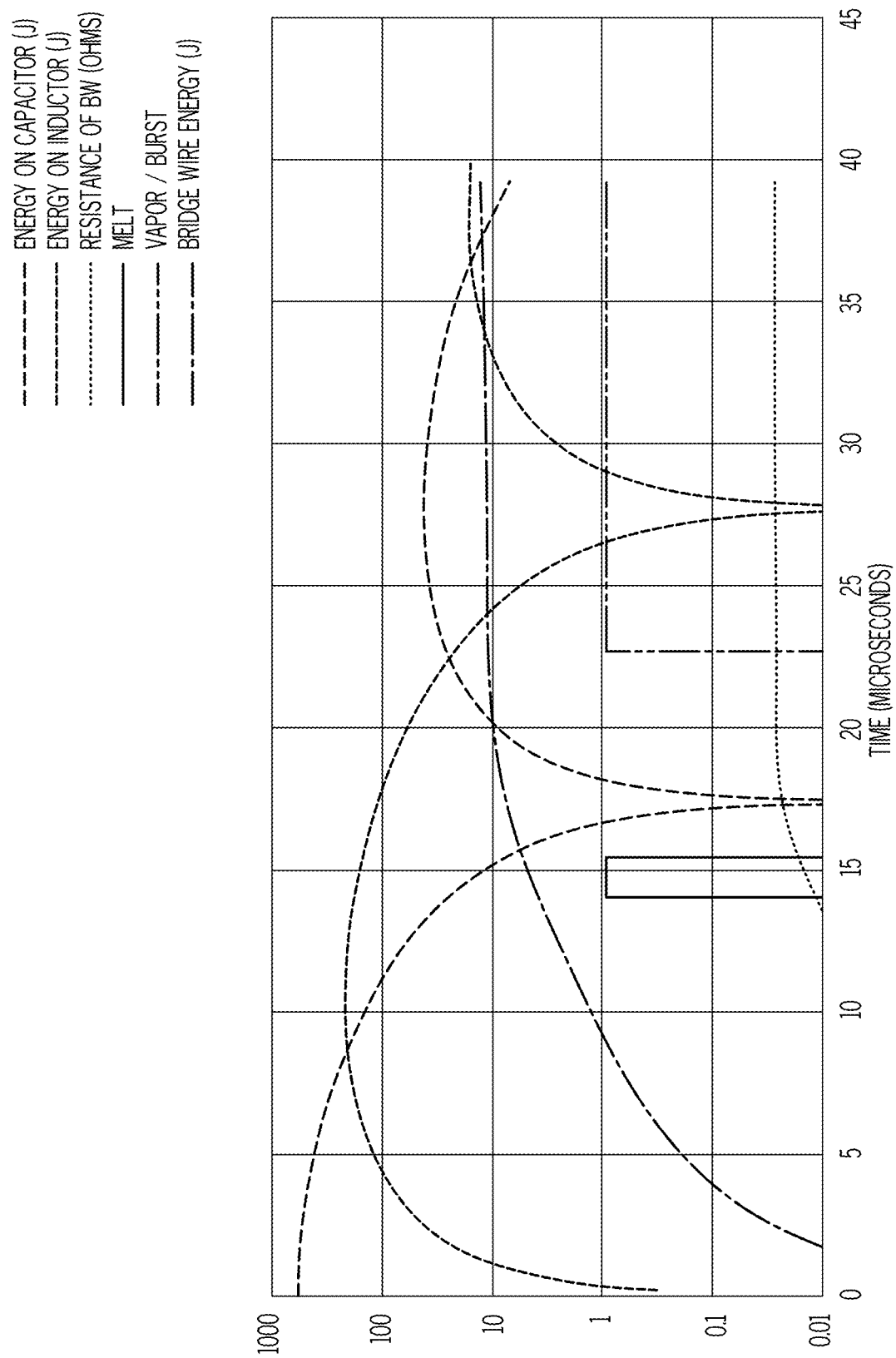

FIG. 17 relates to modeled results for a copper exploding bridge conductor having 27-gauge equivalence, with a test pulser configuration of 14 uF, 450 mOhm, 5 uH, 10 kV charge.

Figure 18:
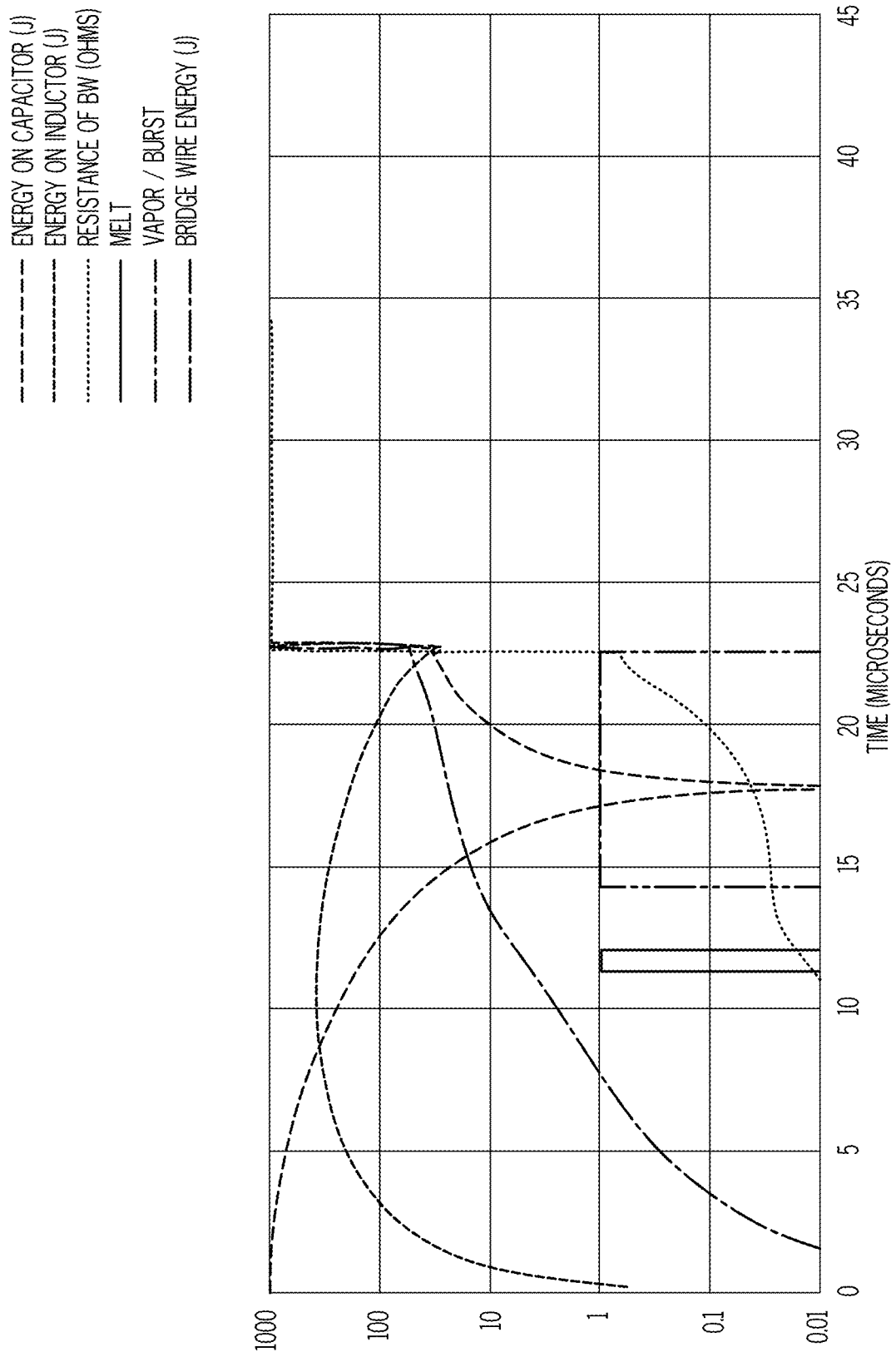

FIG. 18 relates to modeled results for a copper exploding bridge conductor having 27-gauge equivalence, with a test pulser configuration of 14 uF, 450 mOhm, 5 uH, 12 kV charge voltage.

Figure 19:
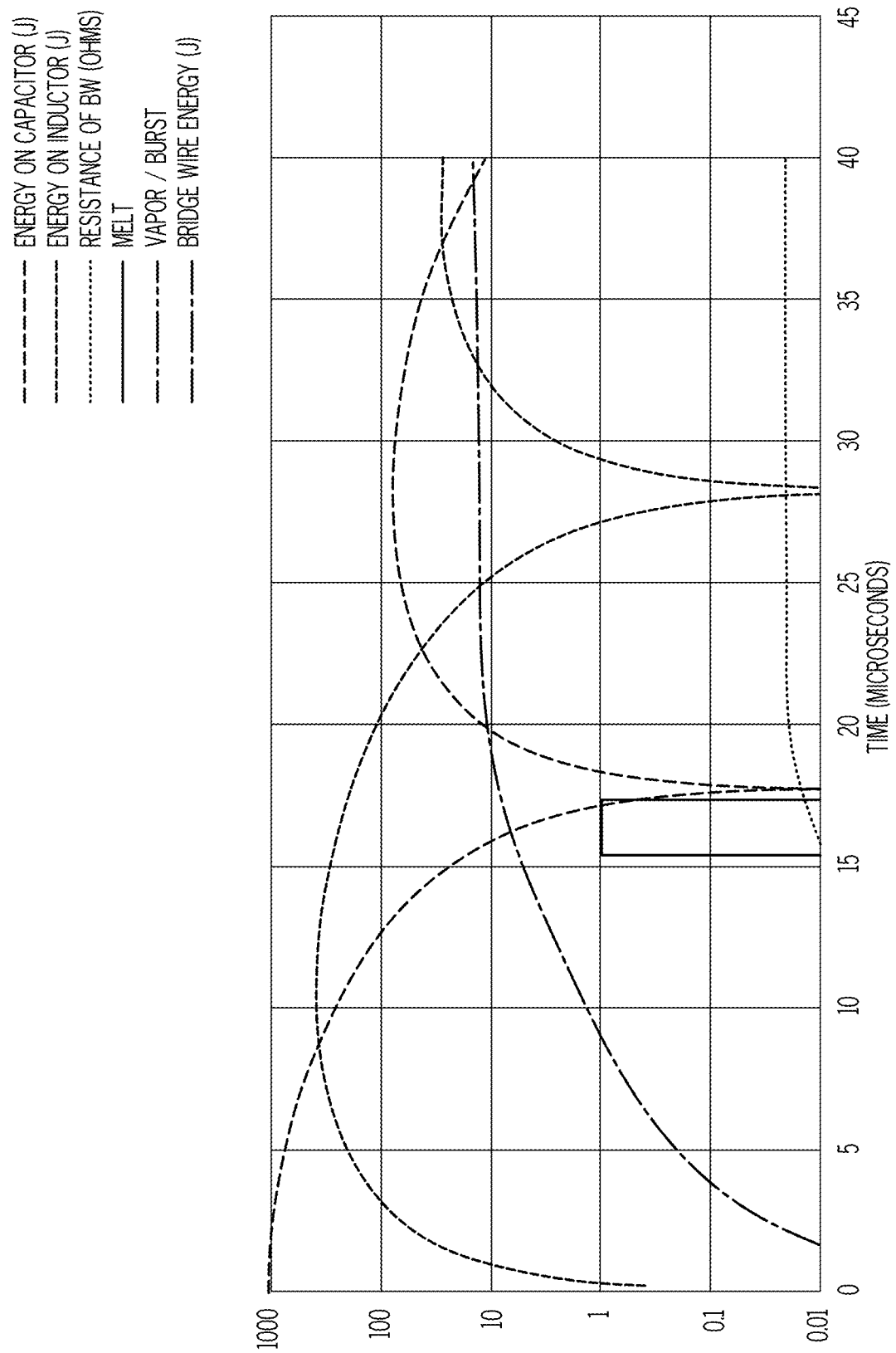

FIG. 19 relates to modeled results for a copper exploding bridge conductor having 26-gauge equivalence, with a test pulser configuration of 14 uF, 450 mOhm, 5 uH, 12 kV charge voltage.

Figure 20:
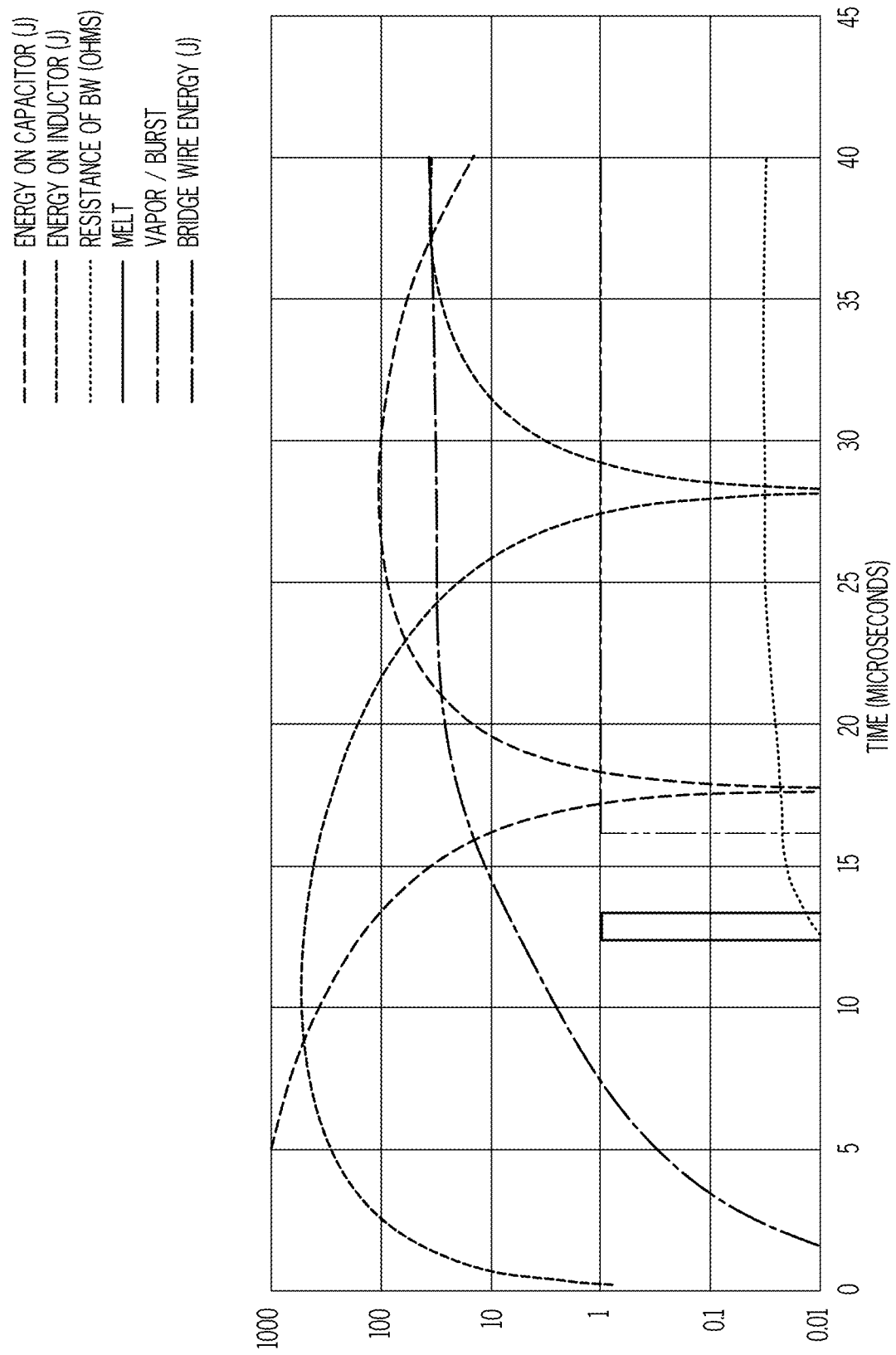

FIG. 20 relates to modeled results for a copper exploding bridge conductor having 26-gauge equivalence, with a test pulser configuration of 14 uF, 450 mOhm, 5 uH, 14 kV charge voltage.

In each case, the energy on a capacitor was switched into the exploding bridge conductor though a resistor and an inductor, changing the exploding bridge conductor resistivity even as it deposits energy in the exploding bridge conductor. When a certain threshold is achieved then the exploding bridge conductor transitions into a liquid phase. When a second threshold is achieved, then the exploding bridge conductor material transitions into a vapor burst phase.

On the requirement (3), it is noted that while the copper exploding bridge conductor as in FIG. 15 transitions through the liquid phase in less than 1 microsecond as desired, and then to the vapor phase microsecond(s) after that at a charge voltage of 12 kV, that at 10 kV the entire time-line is tripled. The effect then of voltage on time-line is non-linear. This can be seen again in FIG. 16 and FIG. 17, wherein at 12 kV the exploding bridge conductor reaches the liquid phase, but not the vapor phase, which at 14 kV the latter is reached as well.

Additional simulations were conducted for six different exploding bridge conductor materials, all in high pulsed current RLC pulsers with lower drive impedance than shown in FIGS. 15-20. The RLC pulser parameters were taken from the available configurations possible in the high voltage test lab. The pulser in the high voltage test lab holds a number of 14 uF capacitors, in this testing only one was used. Because of the pulsed-current limitations of the capacitors and drive elements, a 450 mOhm resistor was used in the circuit, greatly driving up the charge voltage necessary to reach the exploding bridge conductor vapor phase. While high voltage levels of 10 to 14 kV were used in this testing, it was determined that lower voltages are possible with the right combination of elements.

The resistivity of the six metals as a function of fast-pulsed energy deposition per unit mass was modeled in conjunction with a charged capacitor RLC circuit. These metals were copper, aluminum, iron, tungsten, lead and titanium. In each case, the point at which the respective metal transitioned into the liquid phase and into the vapor phase was indicated in time. The modeling compared a larger capacitance, which lowers the peak voltage necessary to achieve a given total energy, all for 26-gauge equivalent exploding bridge conductors, with the same data for a smaller initial capacitance store. The modeling showed the same lower capacitance driver results for 28-gauge equivalent exploding bridge conductors, and that modeling showed the results for 30-gauge equivalent exploding bridge conductors.

The survey was performed to evaluate whether a much lower voltage driver would be appropriate for the application. As a reminder, the driver used was consistently operated at over 10 kV, which was necessary since a series resistor was applied to the circuit to protect some of the weaker components used in the instrument from excessive pulsed currents. In a driver specifically designed for this application, this series resistor would not be necessary.

In general, what was seen from this modeling was that a lower voltage driver is possible, that at least copper, aluminum, iron and tungsten exploding bridge conductors are all suitable for the application of exploding bridge conductors, that lead has a very low transition threshold and may or may not have enough energy at vaporization without supplementing the amount of material involved, and that titanium has a solid-to-liquid phase that results in a drop in resistivity that defies vaporization and explosion, and therefore titanium seems to be not appropriate or less appropriate.

Experimental Results

FIG. 21 illustrates a test set-up 2120 for a high voltage test lab, showing a CCD (charge coupled device) camera 2122 and a holder 2124 holding the expendable devices under test 2126. The high voltage test lab further included two pulsed power units, i.e., a 4 kiloVolt (kV) 1.9 milliFarad (mF) unit and a 20 kV 98 microFarad (uF) unit (not shown). In addition, the high voltage test lab included a current probe, a data acquisition rack including remote readout of a digitizing oscilloscope, as well as diagnostics, safety interlocks and screens, and a data acquisition computer. The CCD camera was a Cordin 214-4G CCD camera, capable of acquiring 8 frames per trigger. This testing took advantage of individual frame times from ½ microsecond to 2.5 microseconds each. In each shot of an exploding bridge conductor, imagery was recorded, as well as current, voltage, and/or compression.

The exploding bridge conductors tested were all fabricated of copper on a standard FR-4 60 mil circuit board. Several exploding bridge conductor test items were fabricated on each panel. Each board was two-sided copper only, with only FR-4 in between. The manufacture of the circuit boards used a standard copper trace thickness of 1.7 mils in all tests.

The use of a single layer board and of edge-on, well-spaced exploding bridge conductor made the stray capacitance negligible. This had the advantage of eliminating stray in-rush currents that may have caused pre-firing or feedline problems.

Data was acquired with test sets fabricated, in various gauge equivalences, for the exploding bridge conductor masses. In all cases, the length of the exploding bridge conductors was 1 cm, and the total mass of the 3 or 6 exploding bridge conductors together amounted to a 26-wire gauge equivalence, a 27-wire gauge equivalence, or a 28-wire gauge equivalence (in American wire gauge units).

Linear Exploding Bridge Conductor Tests

In first and second tests, in which high voltage pulser shots were taken of the fabricated exploding bridge conductors, the test sets were represented by the expendable devices having the linear array of exploding bridge conductors in FIG. 9. The linear array was 3×1 cm long exploding bridge conductors covering a 1 cm width space each. Table 1 shows data for the high voltage pulser shots taken in first and second tests of the fabricated exploding bridge conductors.

Figure 22:
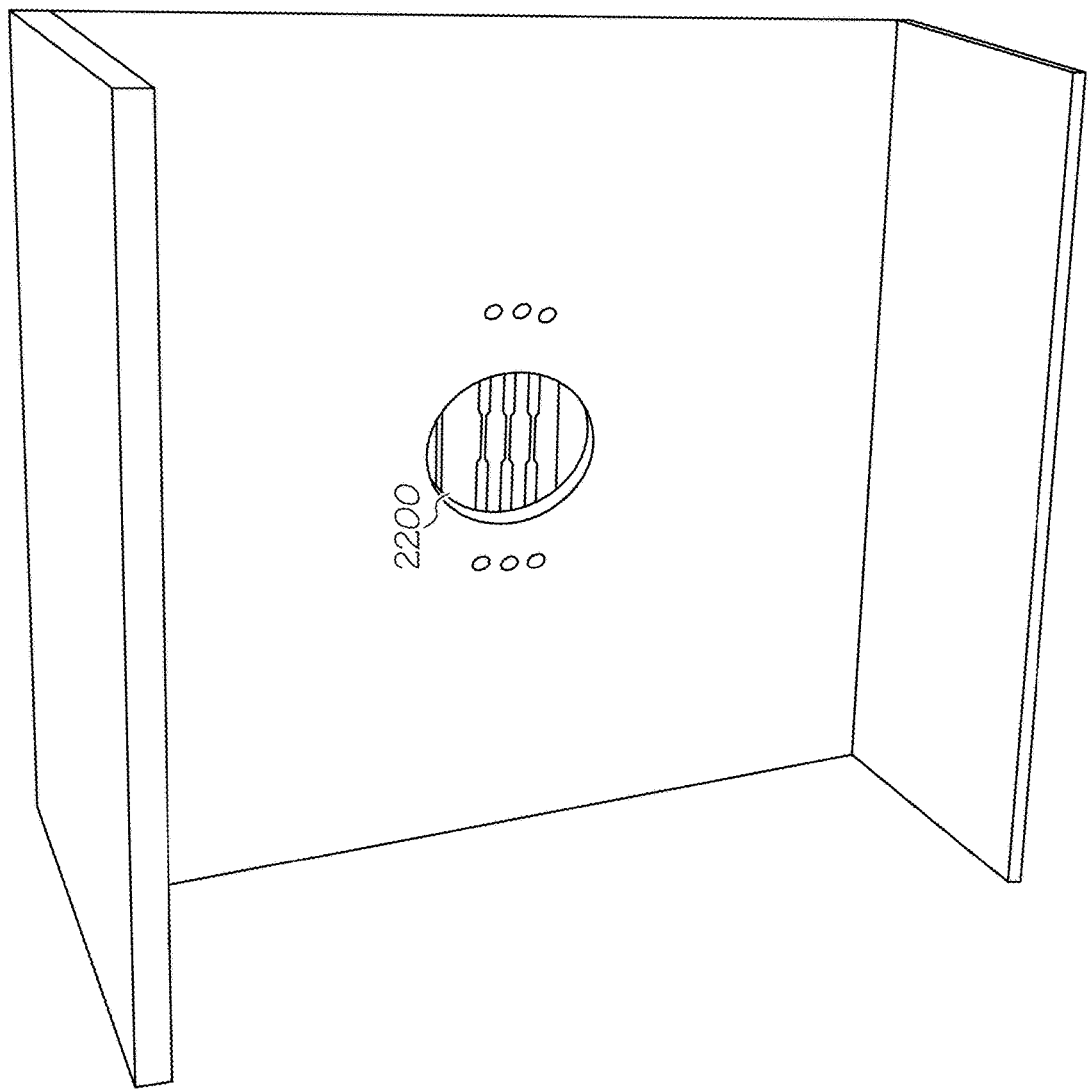
FIG. 22 shows a test device in a holder prior to the test.
Figure 23:
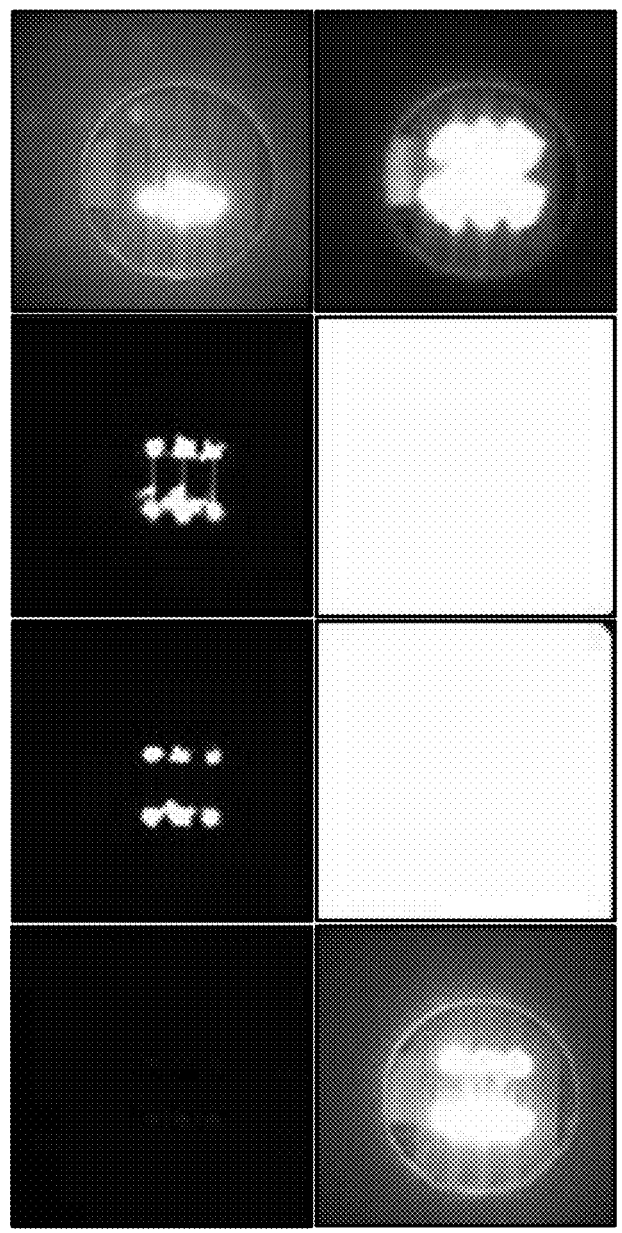
FIG. 23 shows images captured by a camera during a first test.
Figure 24:
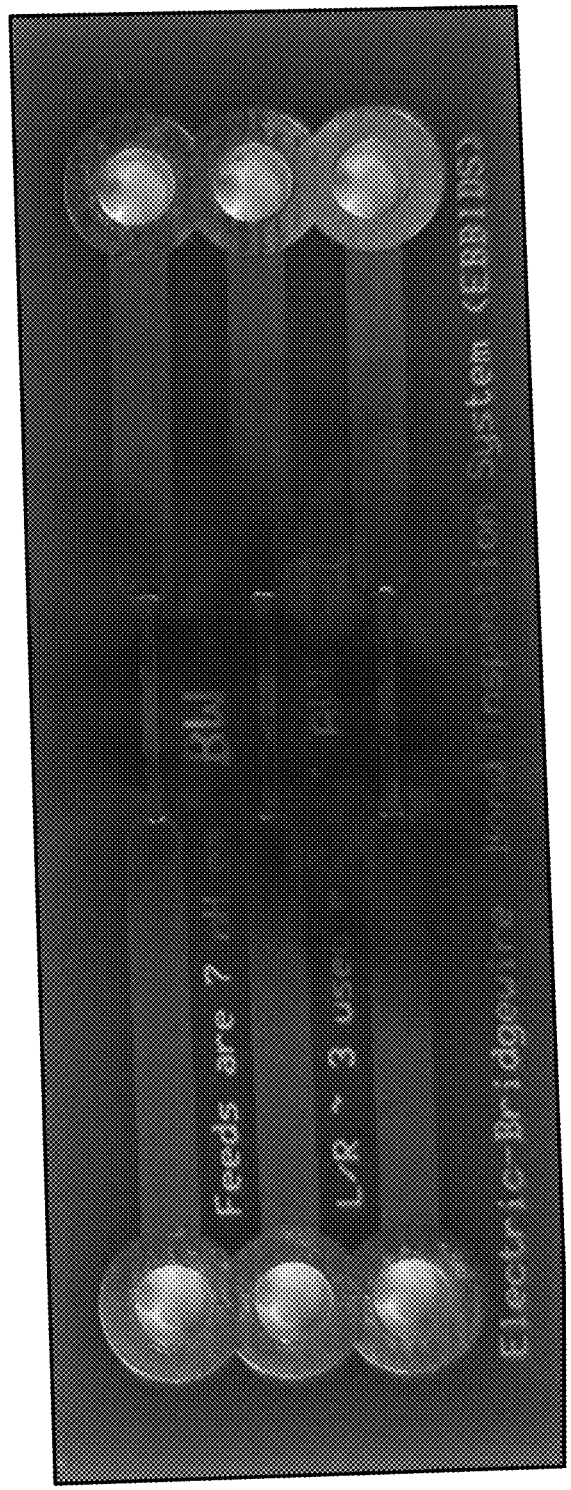
FIG. 24 shows the resulting device after the first test.

FIG. 22 shows the expendable devices 2200 in the holder prior to the first and second test. FIG. 23 shows synchronicity in images captured by the first test in 27-gauge equivalence conductor set within 2.5 microsecond frames, driven at 11 kV. FIG. 24 shows the resulting expendable devices after the first test.

Figure 25:
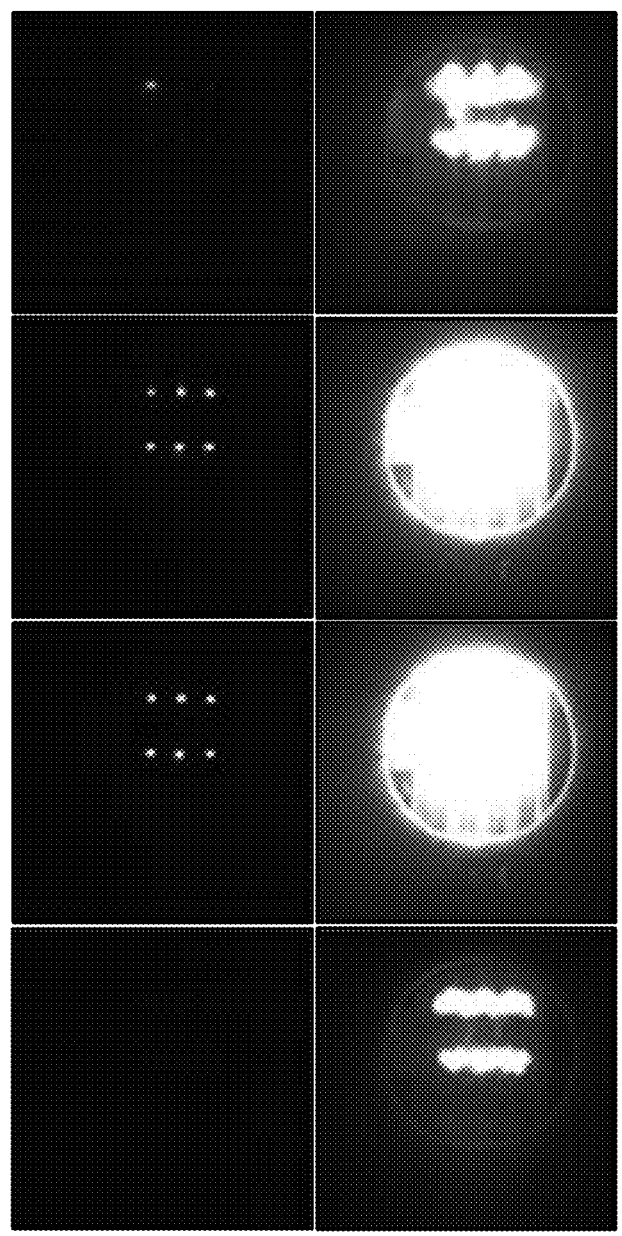
FIG. 25 shows images captured by a camera during a second test.
Figure 26:
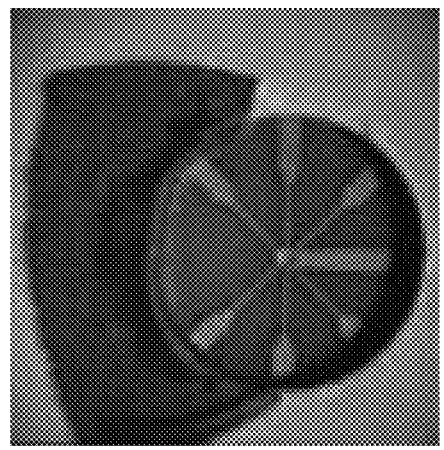
FIG. 26 shows a view of a device through a CCD camera before a test.

FIG. 25 shows synchronicity in images captured by the second test in 27-gauge equivalence conductor set within 0.5 microsecond frames, driven at 11 kV. A very successful part of the exploding bridge conductor demonstration experiment is shown by FIG. 26. The set of exploding bridge conductors showed exact synchronization in exploding to better than ½ microsecond jitter between conductors. The statistics of the measured jitter in uniform measurement bins gives a standard deviation of w/sqrt(12), which in this case amounts to a demonstrated jitter between exploding bridge conductor explosions of 150 ns.

Other linear exploding bridge conductor tests fell into three broad categories. Some of the shots "blew" the copper trace off of the circuit board without much noise, flash or surface burn. These were likely due to the formation of the liquid phase in the copper without the associated vapor burst phase. Another type of shot set generated a large flash of light and an energetic pop when fired. A few shots resulted in the loss of over coating only. All of these occurred within a high voltage range of about 10%. A possible cause is that the trace thickness from one board set to the next is slightly different. Strong production control of the copper deposition for the bridge wires is preferred.

Radial Exploding Bridge Conductor Tests

With the success of demonstrating synchronicity in the linear array, a radial exploding bridge conductor array was fabricated, which is represented by the radial array of exploding bridge conductors in FIG. 10. Table 2 shows data for the high voltage pulser shots taken in a third test of the fabricated exploding bridge conductors.

Figure 27:
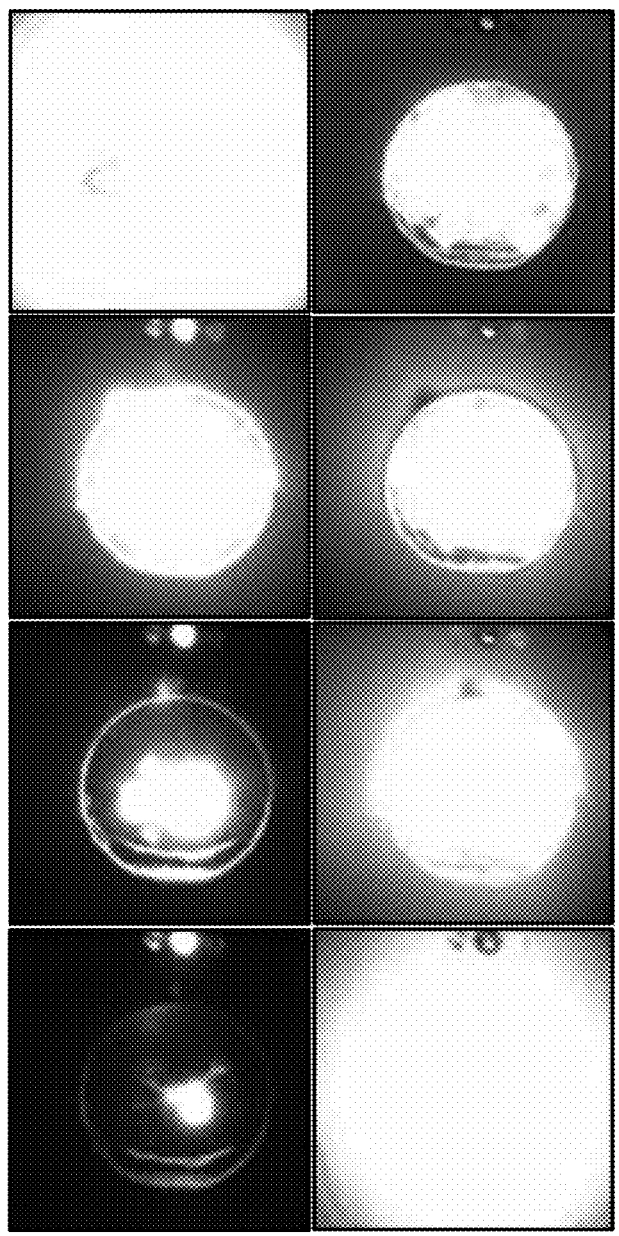
FIG. 27 shows images captured by a camera during a second test.
Figure 28:
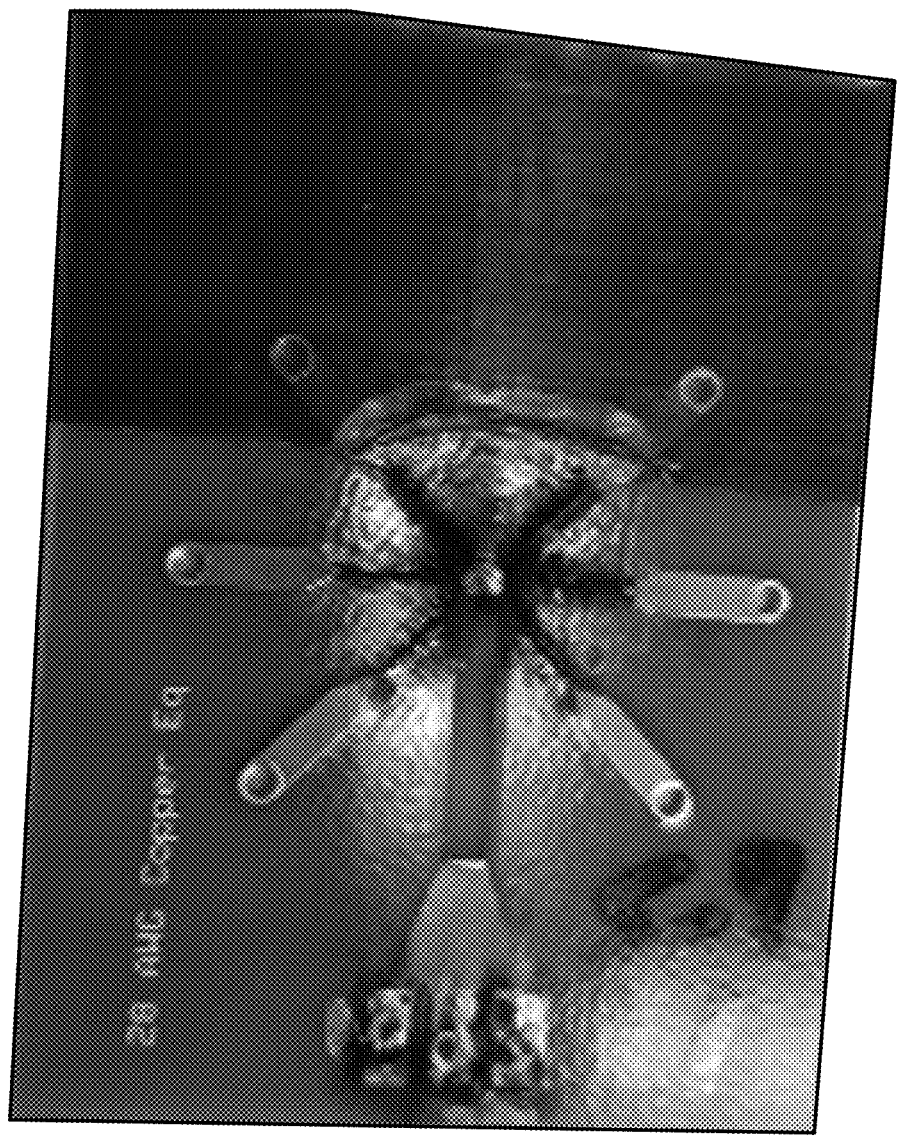
FIG. 28 shows the resulting device after the second test.

FIG. 26 shows the view of the radial exploding bridge conductor array through the CCD camera before firing. FIG. 27 shows the CCD camera shots of the first radial array test, in which all shots fired well. FIG. 28 shows the expendable devices under test evidencing top feed line blow-out.

Further tests were represented by the radial array of exploding bridge conductors in FIG. 11 having another radial array arrangement of exploding bridge conductors. The different arrangements of radial arrays were intended to explore the creation of a planar compression wave that is desired into a structure under test.

Tests Conducted with Bonded Carbon Fiber Reinforced Polymer (CFRP) Panels

Two CFRP samples were located with strong (nominal) bond strength and weak bond strength, respectively, with a format suitable for mating with the exploding bridge conductor test equipment as configured, i.e., a narrow strip, which could then be clamped together with the insulating substrate.

The strong bond tested at ~4Kpsi in flat wise tension tests and the weak bond tested at ~1Kpsi. The flat wise tension (FWT) test is a static mechanical test which is most comparable to a how a shock wave test such as Laser Bond Inspection can interrogate the strength of a bond or structure.

Figure 29:
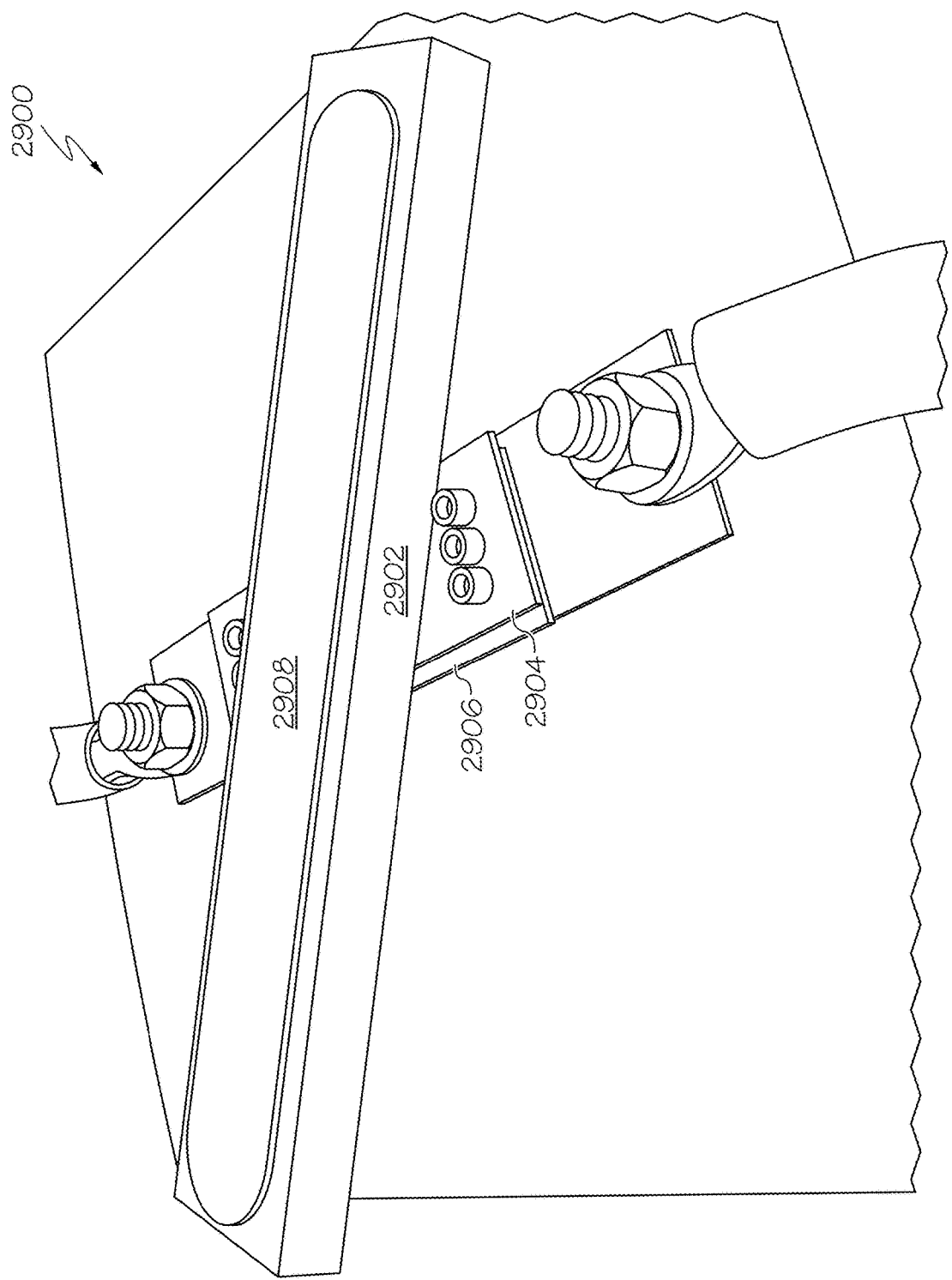
FIG. 29 is a stackup include a structure under test and an exemplary device according to the present description.

The stackup 2900 is illustrated in FIG. 29, including the CFRP 2902, an expendable device including the exploding bridge conductors 2904 facing down away from the CFRP, a passive board 2906 as a bottom component in the stack to act as a reflector over the exploding bridge conductive pattern when they are triggered, and an acoustic reflector 208 made of wood on the back wall on the CFRP. The passive board forces the energy from the expansion and conversion to vapor and plasma in the exploding bridge conductive pattern when triggered back into and through the expendable devices 2904 itself. The expendable devices including the exploding bridge conductive pattern is the second element in the stack up from the bottom. The exploding bridge conductors are facing away from the CFRP sample. Between the expendable devices 2904 and the CFRP panel some acoustic coupling gel has been applied and it pretty much covered the interface between the circuit board and the CFRP sample. The CFRP panel is 0.4 inch in thickness. And on top of the CFRP, a wooden tongue depressor 2908 has been added to form an acoustic impedance mismatch and thus allow the conversion of the upward traveling compression wave in the CFRP into a tension wave traveling back towards the bond line in the CFRP.

As a result of the test, the passive circuit board on the bottom of the stackup was blown out by the force of the expanding plasma, exactly as expected. The action of such a sacrificial tamping layer dramatically enhances the amplitude of the compression wave traveling upward through the expendable devices 2904 and into the CFRP 2902.

An ultrasonic probe was used to evaluate the test area before and after each test and imaging was performed afterwards. Three sites were tested. Two sites on the larger weak bond sample showed that the test caused a disbond in the panel. One site was tested on the smaller nominal strength bond sample. From the hand probe, it seemed at the time that the test had caused a disbond in that sample, but it later was apparent in the imaging that insufficient energy applied to cause a disbond.

Figure 30:
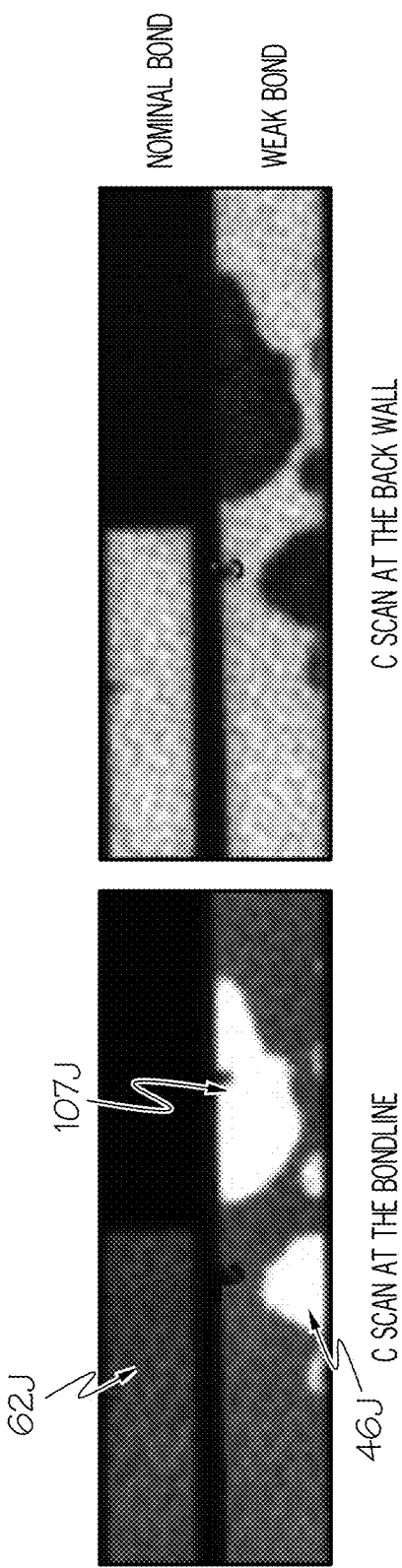
FIG. 30 shows an ultrasound image of bonded material following tests.

Imaging was performed using a focused 3.5 MHz transducer in an immersion tank. FIG. 30 shows an ultrasound image of the bonded material following tests. Breakthrough on the sides of the test panel was due to the size of the panel. As shown in FIG. 30, there were clear disbonds appearing in the weak bond sample at both test locations. In the C scan at the bondline, disbonded areas are shown by enhanced reflection or higher signal. The signal in the C scan at the back wall is lost at those same locations. It is clear that the extent of the gel coupling the expendable devices 2904 to the panel 2902 and the fact that the test sample was narrow, led to breakthrough form the test are to the edges of the sample. At 46 Joule the test area appeared to be more circular and probably not quite centered on the sample. The energy used for the one test on the nominal strength bond sample was selected based on the results from the weak bond sample and was insufficient to cause a disbond in the sample.

From the images, it was concluded that the exploding bridge conductor approach does have potential application for interrogating the strength of bonded CFRP. The exploding bridge conductor approach is a strong candidate technology to replace the laser bond inspection methods. The tests conducted as part of this effort show that multiple circuit board traces can be fired simultaneously and can be controlled by careful design of L/R characteristics. The formation of a compression wave adequate for creating a disbond in CFRP material has been demonstrated.

Figure 31:
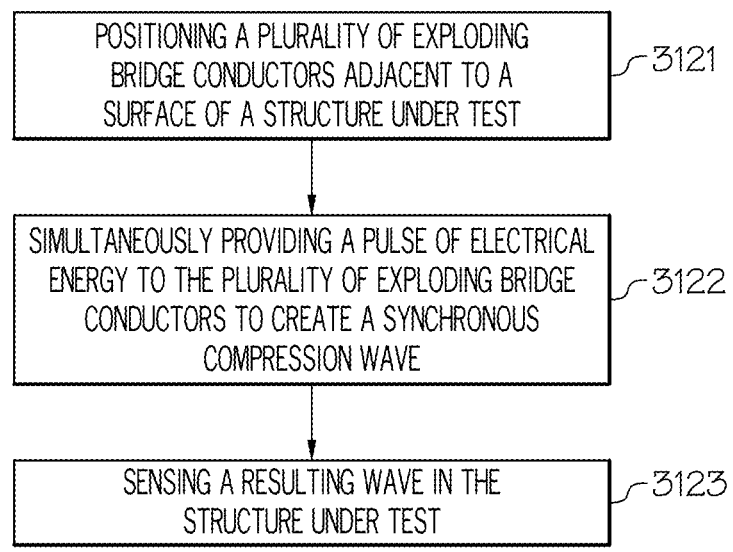
FIG. 31 is a flow diagram representing a bond inspection method according to the present description.

FIG. 31 is a flow diagram representing a bond inspection method 3120, in which the method includes, at block 3121, positioning a plurality of exploding bridge conductors adjacent to a surface of a structure under test, at block 3122, simultaneously providing a pulse of electrical energy to the plurality of exploding bridge conductors to create a synchronous compression wave, and, at block 3123, sensing a resulting wave in the structure under test.

The exploding bridge conductor method allows for measurement of the voltage and current flows during the exploding bridge conductor test.

Figure 32:
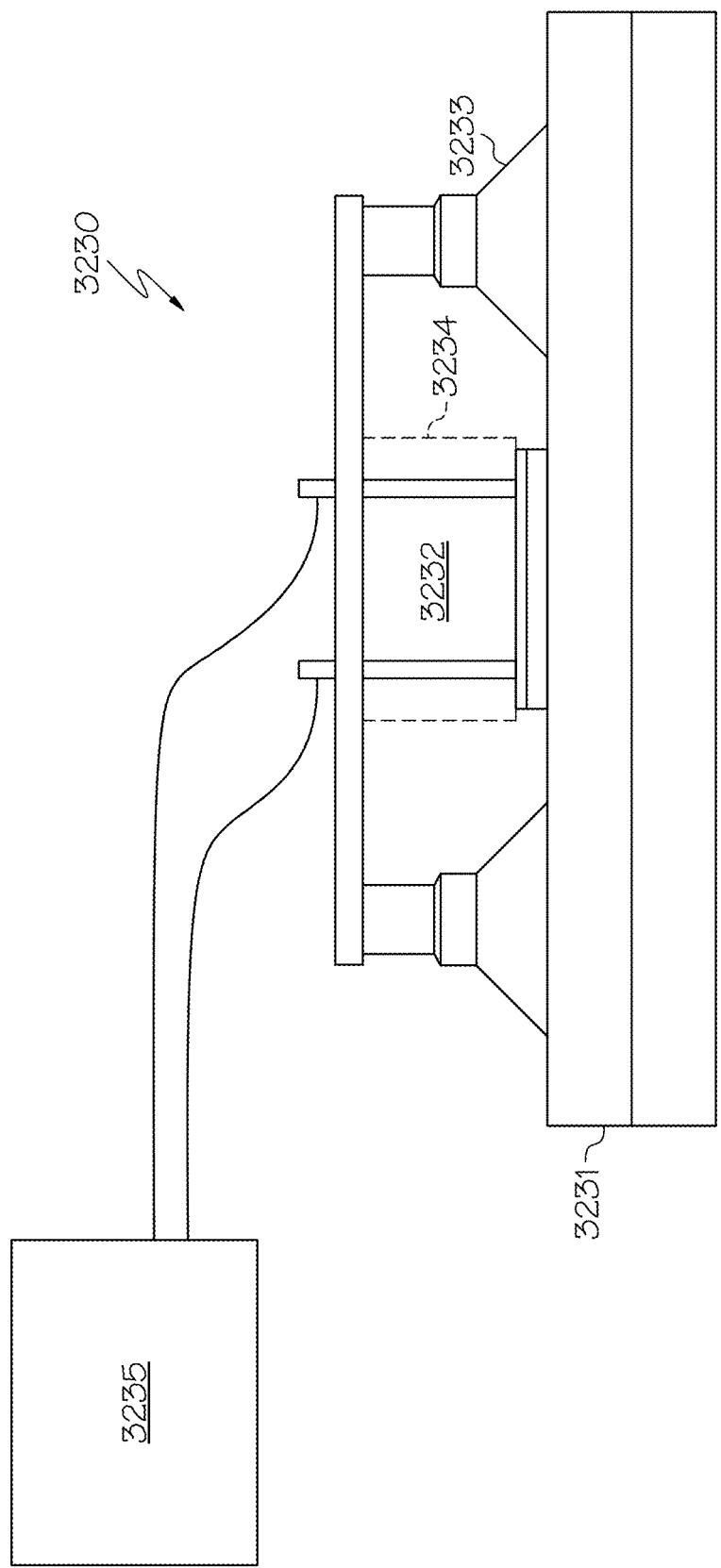
FIG. 32 illustrates a concept level exploding bridge conductor inspection head.

An exemplary inspection head 3230 to support exploding bridge conductors is shown in FIG. 32. FIG. 32 illustrates a concept level exploding bridge conductor inspection head, including structure under test 3231, expendable devices including exploding bridge conductors 3232, suction cups 3233 for holding the expendable devices 3232 on the structure under test 3231, noise and ejecta containment 3234, and pulser 3235. The inspection head may be smaller and more compact compared to the laser bond inspection process head. Both processes produce material ejected from the surface which must be captured. An exploding bridge conductor inspection head may use house vacuum to suction up any ejected material although this function, along with noise suppression, could be performed with a passive element such as a sponge like material.

A new circuit board may be loaded for each test and these are expected to be at minimal cost. This whole approach can be envisioned to permit testing with something like a cartridge holding a stack of circuit boards, each board then slid into the test process head and ejected after each test. The exploding bridge conductor process head may be firmly held against the surface of the composite under test using vacuum suction cups as shown.

Design and patterning of the circuit board for exploding bridge conductors is an approach that may benefit from some refinement. With this method, the shockwave can be shaped or even phased for specific test objectives. The method of firing three traces at one time is enabling milestone itself, which changes the exploding bridge conductor method from a single point source of shockwave generation into an areal source of a more planar shockwave. This is a significant departure from usual test methods involving exploding bridge conductors and one that actually can enable this approach for nondestructive testing. In previously reported work, the impinging laser beam in laser bond inspection has been shaped to form a ring, which creates a zone inside the test material where the shock waves converge and overlap. With this method, it has been demonstrated that it is possible to test thicker bonded CFRP than was possible with a single circular beam. The radial circuit board pattern which was designed and tested in this investigation was a first step in that direction.

There are many clear and obvious advantages of the exploding bridge conductor method for bond testing. The energy which can be deposited in a CFRP substrate using the exploding bridge conductor method is not expensive or limited as it is for laser based methods. Increasing voltage or capacitance are inexpensive to accomplish. Circuit board design and fabrication for use in exploding bridge conductor testing is also an inexpensive process. The method can be very portable. The exploding bridge conductor inspection system may be a small portable cart that can be moved to wherever it is required. With battery power, this system could even become portable as in a backpack.

Thus, the present description provides a technology for replacing a laser with a small and expendable circuit-board like expendable devices that obviates the need for the laser and the laser-safety guards, yet can achieve the same results.

Figure 33:
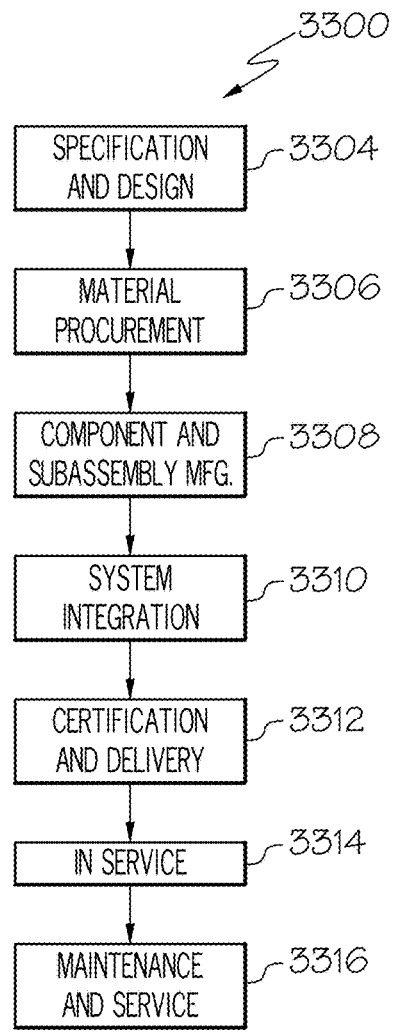
FIG. 33 is flow diagram of an aircraft manufacturing and service methodology.
Figure 34:
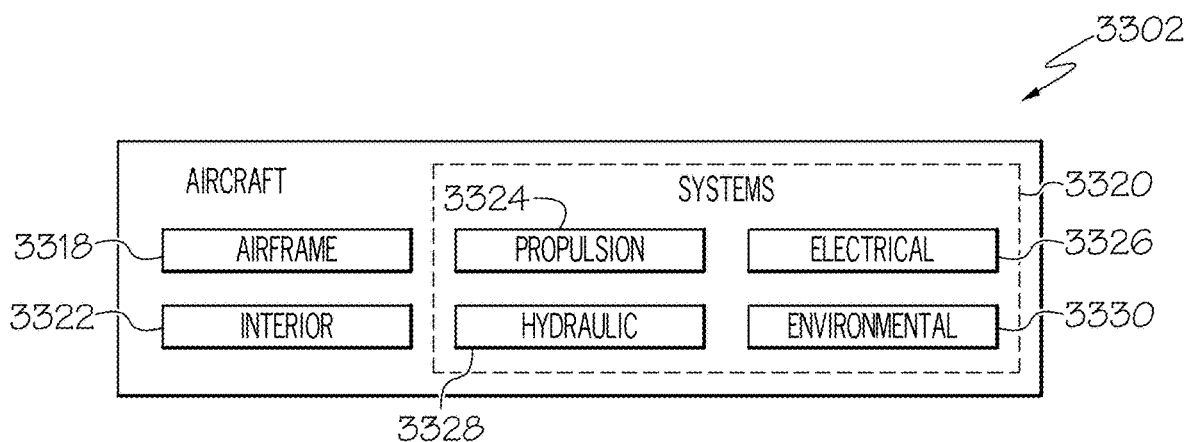
FIG. 34 is a block diagram of an aircraft.

Examples of the present disclosure may be described in the context of an aircraft manufacturing and service method 3300, as shown in FIG. 33, and an aircraft 3302, as shown in FIG. 34. During pre-production, the aircraft manufacturing and service method 3300 may include specification and design 3304 of the aircraft 3302 and material procurement 3306. During production, component/subassembly manufacturing 3308 and system integration 3310 of the aircraft 3302 takes place. Thereafter, the aircraft 3302 may go through certification and delivery 3312 in order to be placed in service 3314. While in service by a customer, the aircraft 3302 is scheduled for routine maintenance and service 3316, which may also include modification, reconfiguration, refurbishment and the like.

Each of the processes of method 3300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

The expendable devices and method may be employed during any one or more of the stages of the aircraft manufacturing and service method 3300, including specification and design 3304 of the aircraft 3302, material procurement 3306, component/subassembly manufacturing 3308, system integration 3310, certification and delivery 3312, placing the aircraft in service 3314, and routine maintenance and service 3316.

As shown in FIG. 25, the aircraft 3302 produced by example method 3300 may include an airframe 3318 with a plurality of systems 3320 and an interior 3322. Examples of the plurality of systems 3320 may include one or more of a propulsion system 3324, an electrical system 3326, a hydraulic system 3328, and an environmental system 3330. Any number of other systems may be included. The disclosed expendable devices and method may be employed for any of the systems of the aircraft 3302, including the airframe 3318 and the interior 3322.

The expendable devices and method are described in the context of an aircraft; however, one of ordinary skill in the art will readily recognize that the expendable devices and method may be utilized for a variety of vehicles and non-vehicles. For example, implementations of the embodiments described herein may be implemented in any type of vehicle including, e.g., helicopters, passenger ships, automobiles and the like.

Although various embodiments of the disclosed bond strength testing systems and methods and compression save producing devices for use therein have been shown and described, modifications may occur to those skilled in the art upon reading the specification. The present application includes such modifications and is limited only by the scope of the claims.

What is claimed is:

1. A nondestructive bond strength testing method, comprising:
    coupling an expendable device to a structure under test, the expendable device including a patterned planar array of exploding bridge wires, wherein each exploding bridge wire comprises a first shoulder portion and a second shoulder portion separated from the first shoulder portion, wherein an exploding bridge portion connects the first shoulder portion and the second shoulder portion;

simultaneously vaporizing the patterned planar array of exploding bridge wires by applying a pulse of electrical energy to the patterned planar array of exploding bridge wires; and sensing an initial disbonding signature of the structure under test.

2. The nondestructive bond strength testing method of claim 1, wherein the structure under test includes a first part and a second part bonded together at a subsurface bond interface.

3. The nondestructive bond strength testing method of claim 2, wherein a material of at least one of the first part and the second part is a composite material.

4. The nondestructive bond strength testing method of claim 1, wherein the step of coupling the expendable device to the structure under test includes positioning a coupling material between the expendable device and the structure under test.

5. The nondestructive bond strength testing method of claim 1, wherein the step of simultaneously vaporizing the patterned planar array of exploding bridge wires by applying a pulse of electrical energy to the patterned planar array of exploding bridge wires generates a planar compression wave.

6. The nondestructive bond strength testing method of claim 1, wherein a first expendable device, which includes a first patterned planar array of exploding bridge wires, and a second expendable device, which includes a second patterned planar array of exploding bridge wires, are coupled to the structure under test at opposing side of an obstruction.

7. The nondestructive bond strength testing method of claim 1, wherein a laser is used in conjunction with the multiple planar arrays of exploding bridge wires coupled to a structure under test.

8. The nondestructive bond strength testing method of claim 1, wherein the expendable device comprises a substrate; and a patterned planar array of exploding bridge wires formed on the substrate.

9. The nondestructive bond strength testing method of claim 8 wherein the substrate of the expendable device is a fiberglass substrate.

10. The nondestructive bond strength testing method of claim 8 wherein the expendable device further comprises a tamping layer on the patterned planar array of exploding bridge wires.

11. The nondestructive bond strength testing method of claim 10 wherein the tamping layer is thinner than the substrate.

12. The nondestructive bond strength testing method of claim 10 wherein the expendable device further comprises a shielding layer on a lower surface thereof.

13. The nondestructive bond strength testing method of claim 8 wherein the substrate of the expendable device is a flexible substrate.

14. The nondestructive bond strength testing method of claim 8 wherein the expendable device further comprises terminals to electrically connect to a pulsed-power unit.

15. The nondestructive bond strength testing method of claim 1 wherein each exploding bridge portion has reduced cross-sectional area relative to its respective first and second shoulder portions.

16. The nondestructive bond strength testing method of claim 1 wherein the exploding bridge portions have a combined explosive yield of 100 J/cm$^2$ or less.

17. The nondestructive bond strength testing method of claim 1 wherein the exploding bridge portions have a combined explosive intensity of 50 J/cm$^2$ or less.

18. The nondestructive bond strength testing method of claim 1 wherein the exploding bridge portions have a combined explosive intensity of between 20-40 J/cm$^2$.

19. The nondestructive bond strength testing method of claim 1 wherein a plurality of the exploding bridge portions are connected in parallel.

20. The nondestructive bond strength testing method of claim 1 wherein a plurality of the exploding bridge portions are arranged in a linear array.

21. The nondestructive bond strength testing method of claim 1 wherein a plurality of the exploding bridge portions are arranged in a radial array.

22. A nondestructive bond strength testing system, comprising:

an expendable device for coupling to a structure under test, the expendable device including a patterned planar array of exploding bridge wires for producing a planar compression wave, wherein each exploding bridge wire comprises a first shoulder portion and a second shoulder portion separated from the first shoulder portion, wherein an exploding bridge portion connects the first shoulder portion and the second shoulder portion;

a pulsed-power unit for applying a pulse of electrical energy to the patterned planar array of exploding bridge wires; and a disbond detecting sensor for sensing an initial disbonding signature of the structure under test.

23. The nondestructive bond strength testing system of claim 22 further comprising an inspection head for retaining the expendable device against the structure under test.

24. The nondestructive bond strength testing system of claim 22 further comprising a reeling system having a plurality of expendable devices thereon.

25. The nondestructive bond strength testing system of claim 22 further comprising a dispenser for holding and dispensing a plurality of expendable devices.

26. The nondestructive bond strength testing system of claim 22, wherein the expendable device comprises a substrate; and a patterned planar array of exploding bridge wires formed on the substrate.

27. The nondestructive bond strength testing system of claim 26 wherein the substrate of the expendable device is a fiberglass substrate.

28. The nondestructive bond strength testing system of claim 26 wherein the expendable device further comprises a tamping layer on the patterned planar array of exploding bridge wires.

29. The nondestructive bond strength testing system of claim 28 wherein the tamping layer is thinner than the substrate.

30. The nondestructive bond strength testing system of claim 28 wherein the expendable device further comprises a shielding layer on a lower surface thereof.

31. The nondestructive bond strength testing system of claim 26 wherein the substrate of the expendable device is a flexible substrate.

32. The nondestructive bond strength testing system of claim 26 wherein the expendable device further comprises terminals to electrically connect to a pulsed-power unit.

33. The nondestructive bond strength testing system of claim 22 wherein each exploding bridge portion has reduced cross-sectional area relative to its respective first and second shoulder portions.

34. The nondestructive bond strength testing system of claim 22 wherein the exploding bridge portions have a combined explosive yield of 100 J/cm² or less.

35. The nondestructive bond strength testing system of claim 22 wherein the exploding bridge portions have a combined explosive intensity of 50 J/cm² or less.

36. The nondestructive bond strength testing system of claim 22 wherein the exploding bridge portions have a combined explosive intensity of between 20-40 J/cm².

37. The nondestructive bond strength testing system of claim 22 wherein a plurality of the exploding bridge portions are connected in parallel.

38. The nondestructive bond strength testing system of claim 22 wherein a plurality of the exploding bridge portions are arranged in a linear array.

39. The nondestructive bond strength testing system of claim 22 wherein a plurality of the exploding bridge portions are arranged in a radial array.

40. An expendable device for producing a compression wave, comprising:
   a substrate; and
   a patterned planar array of exploding bridge wires formed on the substrate, wherein each exploding bridge wire comprises a first shoulder portion and a second shoulder portion separated from the first shoulder portion, wherein an exploding bridge portion connects the first shoulder portion and the second shoulder portion.

41. The expendable device of claim 40 wherein the substrate is a fiberglass substrate.

42. The expendable device of claim 40 further comprising a tamping layer on the patterned planar array of exploding bridge wires.

43. The expendable device of claim 42 wherein the tamping layer is thinner than the substrate.

44. The expendable device of claim 42 further comprising a shielding layer on a lower surface thereof.

45. The expendable device of claim 40 wherein the substrate is a flexible substrate.

46. The expendable device of claim 40 further comprising terminals to electrically connect to a pulsed-power unit.

47. The expendable device of claim 40 wherein each exploding bridge portion has reduced cross-sectional area relative to its respective first and second shoulder portions.

48. The expendable device of claim 40 wherein the exploding bridge portions have a combined explosive yield of 100 J/cm² or less.

49. The expendable device of claim 40 wherein the exploding bridge portions have a combined explosive intensity of 50 J/cm² or less.

50. The expendable device of claim 40 wherein the exploding bridge portions have a combined explosive intensity of between 20-40 J/cm².

51. The expendable device of claim 40 wherein a plurality of the exploding bridge portions are connected in parallel.

52. The expendable device of claim 40 wherein a plurality of the exploding bridge portions are arranged in a linear array.

53. The expendable device of claim 40 wherein a plurality of the exploding bridge portions are arranged in a radial array.

* * * * *